US 8,219,042 B2

United States Patent
Nakashima et al.

(10) Patent No.: US 8,219,042 B2
(45) Date of Patent: Jul. 10, 2012

(54) WIRELESS COMMUNICATION SYSTEM, BASE STATION DEVICE, MOBILE STATION DEVICE, AND MACRODIVERSITY SELECTION METHOD

(75) Inventors: Daiichiro Nakashima, Chiba (JP); Hidenobu Fukumasa, Narashino (JP)

(73) Assignee: Sharp Kabushiki Kaisha, Osaka (JP)

( * ) Notice: Subject to any disclaimer, the term of this patent is extended or adjusted under 35 U.S.C. 154(b) by 1146 days.

(21) Appl. No.: 12/067,762

(22) PCT Filed: Sep. 11, 2006

(86) PCT No.: PCT/JP2006/317957
§ 371 (c)(1),
(2), (4) Date: Mar. 21, 2008

(87) PCT Pub. No.: WO2007/034700
PCT Pub. Date: Mar. 29, 2007

(65) Prior Publication Data
US 2009/0137237 A1    May 28, 2009

(30) Foreign Application Priority Data

Sep. 26, 2005    (JP) .................... 2005-277642

(51) Int. Cl.
*H03C 7/02*    (2006.01)
*H04B 1/00*    (2006.01)
*H04B 15/00*    (2006.01)
*H04M 1/38*    (2006.01)

(52) U.S. Cl. ............... 455/101; 455/114.2; 455/561; 455/422.1; 455/444; 455/63.1

(58) Field of Classification Search ............ 455/101, 455/422.1, 424, 425, 435.2, 444, 445, 449, 455/450, 452.1, 456.5, 13.4, 504, 506, 507, 455/524, 525, 63.1, 65, 67.11, 67.13, 69, 455/105, 115.1, 522, 456.6, 561; 375/267, 375/295, 299; 370/334
See application file for complete search history.

(56) References Cited

U.S. PATENT DOCUMENTS

| 6,594,473 | B1  |   | 7/2003  | Dabak et al.          |
|-----------|-----|---|---------|-----------------------|
| 7,069,009 | B2  | * | 6/2006  | Li et al. ........ 455/446 |
| 7,634,287 | B1  | * | 12/2009 | Bambos et al. ... 455/522 |

(Continued)

FOREIGN PATENT DOCUMENTS

JP    6-13951 A    1/1994

(Continued)

OTHER PUBLICATIONS

"Investigations on Inter-Sector Diversity in Evolved UTRA Downlink", 3GPP TSG RAN WG1 Ad Hoc on LTE, Sophia Antipolis, France, Jun. 20-21, 2005, R1-050615.

(Continued)

*Primary Examiner* — Pablo Tran
(74) *Attorney, Agent, or Firm* — Birch, Stewart, Kolasch & Birch, LLP

(57) ABSTRACT

A wireless communication system, a base station device, a mobile station device, and a macrodiversity selection method of the invention, in a base station device including a macrodiversity function among a plurality of sectors, select a macrodiversity method for the mobile station device from a plurality of macrodiversity methods, in accordance with a predetermined determination reference based on reception conditions of the mobile station device.

35 Claims, 23 Drawing Sheets

U.S. PATENT DOCUMENTS

| | | | |
|---|---|---|---|
| 7,787,552 B2 * | 8/2010 | Chen et al. ............... | 375/267 |
| 2001/0041569 A1 | 11/2001 | Rahman | |
| 2003/0190897 A1 * | 10/2003 | Lei et al. .................. | 455/101 |
| 2004/0038713 A1 * | 2/2004 | Okawa et al. ............. | 455/561 |
| 2004/0091026 A1 | 5/2004 | Nakayama | |
| 2004/0116146 A1 * | 6/2004 | Sadowsky et al. ......... | 455/525 |
| 2004/0127223 A1 * | 7/2004 | Li et al. .................... | 455/446 |
| 2006/0073790 A1 * | 4/2006 | Kent et al. ................ | 455/67.11 |
| 2007/0149127 A1 * | 6/2007 | Karabinis ................. | 455/63.1 |
| 2008/0108310 A1 * | 5/2008 | Tong et al. ................ | 455/69 |
| 2011/0003607 A1 * | 1/2011 | Forenza et al. ........... | 455/501 |

FOREIGN PATENT DOCUMENTS

| | | | |
|---|---|---|---|
| JP | 8-172390 A | | 7/1996 |
| JP | 2001-16633 A | | 1/2001 |
| JP | 2001-44900 A | | 2/2001 |
| JP | 2003-23381 A | | 1/2003 |
| JP | 2003-338781 A | | 11/2003 |
| JP | 2004-153585 A | | 5/2004 |
| JP | 2004153585 A | * | 5/2004 |
| JP | 2005-136492 A | | 5/2005 |
| JP | 2005-236368 A | | 9/2005 |
| JP | 2006-173924 A | | 6/2006 |
| WO | WO 2004/039011 A2 | | 5/2004 |

OTHER PUBLICATIONS

"On Macro Diversity for E-UTRA", TSG-RAN WG1 Ad Hoc on LTE, Sophia Antipolis, France, Jun. 20-21, 2005, R1-050624.

3GPP TS 25.214 V6.6.0 (Jun. 2005) 3rd Generation Partnership Project; Technical Specification Group Radio Access Network; Physical layer procedures (FF) (Release 6).

3GPP TSG RAN WG1 Ad Hoc on LTE R1-050587, France, Jun. 20-21, 2005 pp. 1-25.

* cited by examiner

WIRELESS COMMUNICATION SYSTEM, BASE STATION DEVICE, MOBILE STATION DEVICE, AND MACRODIVERSITY SELECTION METHOD

TECHNICAL FIELD

The present invention relates to a base station device that uses a plurality of sectors to perform macrodiversity transmission to a mobile station device, a mobile station device that transmits data relating to a macrodiversity method to the base station device, a macrodiversity selection method relating to the selection of a macrodiversity method, and a wireless communication system that performs macrodiversity transmission.

Priority is claimed on Japanese Patent Application No. 2005-277642, filed Sep. 26, 2005, the content of which is incorporated herein by reference.

BACKGROUND ART

Recently, research and development of a new generation of wireless communication systems after International Mobile Telecommunication 2000 (IMT-2000) is progressing. The 3rd Generation Partnership Project (3GPP) that determines international standardizations for mobile wireless communication systems is debating a new generation of wireless communication systems known as Long Term Evolution (LTE). One of its important objectives is to consider ways of improving characteristics of mobile station devices at cell/sector edges.

FIGS. 20A and 20B are plan views showing an example of a cell/sector configuration (see Non-Patent Document 1). As shown in FIG. 20A, one cell (e.g. cell c1) is adjacent to six cells (c2 to c7). A base station device (e.g. base station device 1) performs communication by dividing one cell (e.g. cell c1) into three sectors (sectors #11, #12, and #13). Cell c2 is divided into sectors #21, #22, and #23, cell c3 is divided into sectors #31, #32, and #33, cell c4 is divided into sectors #41, #42, and #43, cell c5 is divided into sectors #51, #52, and #53, cell c6 is divided into sectors #61, #62, and #63, and cell c7 is divided into sectors #71, #72, and #73.

FIG. 20B is an enlarged view of the region including the cell c1 and cell c2 of FIG. 20A. In FIG. 20B, an interface between two sectors belonging to a base station device 1 (here, the interface between sector #11 and sector #12, being a straight line connecting point P1 and point P2) is termed a sector edge. An interface between cells of two base station devices 1 (here, the interface between cell c1 and cell c2, being a straight line connecting point P3 and point P4) is termed a cell edge.

The base station device 1 employs a one-cell repetition system using an identical frequency where, to reduce affects of mutual interference between adjacent base station devices (cells), one-cell repetitions of frequency are implemented by, for example, multiplying the transmit signal with a different scrambling code for each cell, thereby smoothing the interference. The base station device 1 includes a plurality of sector antennas configured from directional antennas, a plurality of fan-like sectors (e.g. sectors #11, #12, and #13) are arranged in one cell (e.g. cell c1), and an identical frequency is repeatedly used. This cell/sector configuration enhances the frequency usage efficiency, and increases the subscriber capacity. However, cell edge/sector edge mobile station devices are at least affected by interference from other cells and other sectors, leading to a problem of deteriorating characteristics.

Macrodiversity is considered as one technique for solving this problem. Macrodiversity is a technique that uses a plurality of cells and sectors to make a diverse transmission of a transmit signal to a mobile station device.

FIG. 21 shows one example of a macrodiversity method (hereinafter macrodiversity method B) of transmitting from a plurality of sectors using signals created from data that differs between sectors. In FIG. 21, a base station device 1 transmits a signal S1 to sector #1 using an antenna a1, and transmits a signal S2 to sector #2 using an antenna a2.

Signal S1 is transmitted at time intervals $t_{1b}$, $t_{1d}$, and $t_{1f}$, and is not transmitted at time intervals $t_{1a}$, $t_{1c}$, and $t_{1e}$. In contrast, signal 82 is transmitted at time intervals $t_{1a}$, $t_{1c}$ and $t_{1e}$, and is not transmitted at time intervals $t_{1b}$, $t_{1d}$, and $t_{1f}$.

For example, fast sector selection with transmission muting method can be used as the macrodiversity method B. In this method, while the base station device 2 transmits a signal after selecting a sector having high reception power or high received signal to interference plus noise ratio (SINR), and the selected sector is transmitting another sector stops transmission such as to suppress an interference component received by the transmitting sector (Non-Patent Document 2). There is a similar method where, instead of making another sector stop transmission as in fast sector selection with transmission muting, the transmission power is set to a smaller value than another sector, thereby relieving the interference component applied to the other sector.

FIG. 22 shows an example of a macrodiversity method (hereinafter macrodiversity method A) of transmitting from a plurality of sectors using a signal created from identical data between sectors. In FIG. 22, a base station device 1 transmits a signal S3 from sector #1 using antenna a1, and a signal S4 from sector #2 using antenna a2, to a mobile station device 2.

Signal S3 transmitted at time intervals $t_{3a}$, to $t_{3f}$, and signal S4 transmitted at time intervals $t_{4a}$ to $t_{4f}$ are transmitted from the base station device 1 such that they become the same signal.

For example, soft combining method can be used as macrodiversity method A. This is a method where both sectors transmit identical signals created from identical data at identical timings to an identical mobile station device 2, increasing the signal component of the mobile station device 2 while suppressing the interference component (Non-Patent Document 3).

Since the macrodiversity methods A and B described above assume that synchrony among the sectors is obtained at the base station device 1, they do not require complex processes such as, for example, in a soft handoff between cells in a code division multiple access (CDMA) communication system shown in Patent Document 1, where a RAKE receiver performs synthesis by synchronizing signals from each cell.

Another example of a macrodiversity method of transmitting from a plurality of sectors using signals created from identical data between the sectors is space time transmit diversity (STTD), which transmits, from a plurality of sectors, signals that are encoded by space-time encoding between the sectors, and also obtains coded gain (see Patent Document 2). For example, a base station device space-time encodes a modulation signal with two STTD codes, transmits one STTD code from one sector, and simultaneously transmits the other STTD code from another sector. The mobile station device estimates the channel of each sector, and performs STTD decoding using the estimated channel of each sector Also, there is a method of obtaining transmit diversity using a plurality of transmission antennas in an identical sector, whereby closed loop transmit diversity (Non-Patent Document 4) where transmit weight is calculated based on channel information of the mobile station device 2 and the signal is transmitted after multiplying by the calculated weight with each antenna, is applied in transmit antennas of different sectors (hereinafter termed closed loop macrodiversity method), and such like. For example, a transmit weight that maximizes the reception power P of the mobile station device can be determined from equation (1) below.

$$P = w^H H^H H w \quad (1)$$

Here, H represents the channel response for signals from each sector, and w represents the transmit weight of each sector; when using two sectors, $H=[h_1, h_2]$, $w=[w_1, w_2]T$, where $h_1$ is the channel response for a signal from sector #1, $h_2$ is the channel response for a signal from sector #2, $w_1$ is the transmit weight of sector #1, and $w_2$ is the transmit weight of sector #2. The mobile station device feeds back the determined transmit weights to the base station device, which transmits the signals simultaneously using the fed-back transmit weights in each sector.

These macrodiversity methods A and B can enhance the received SINR of the mobile station device 2. Macrodiversity method B is realized by suppressing the interference component between sectors, while macrodiversity method A is realized by suppressing the interference component between sectors while increasing the signal component. Due to this increasing of the signal component by transmitting signals simultaneously from a plurality of sectors, macrodiversity method A can generally enhance the received SINR more than macrodiversity method B.

[Patent Document 1] Japanese Unexamined Patent Application, First Publication, (JP-A) No. H0-172390
[Patent Document 2] Japanese Unexamined Patent Application, First Publication, (JP-A) No. 2003-23381
[Non-Patent Document 1] 3GPP TSG RAN WG1 Ad Hoc on LTE Sophia Antipolis, France, 20-21 Jun., 2005 R1-050587, "OFDM Radio Parameter Set in Evolved UTRA Downlink"
[Non-Patent Document 2] 3GPP TSG RAN WG1 Ad Hoc on LTE Sophia Antipolis, France, 20-21 Jun., 2005 R1-050624, "On Macro Diversity for E-UTRA"
[Non-Patent Document 3] 3GPP TSG RAN WG1 Ad Hoc on LTE Sophia Antipolis, France, 20-21 Jun., 2005 R1-050615, "Investigations on Inter-Sector Diversity in Evolved UTRA Downlink"
[Non-Patent Document 4] 3GPP TS 25.214, "Physical layer procedures (FDD)".

However, conventional techniques consider only two sectors, and do not consider interference component applied to other sectors and other cells in a wireless communication system. This will be explained using soft-combining as macrodiversity method A, and fast sector selection with transmission muting as macrodiversity method B. While fast sector selection with transmission muting cannot obtain an additional increase in the signal component since it stops transmission from one sector, in comparison with when not using macrodiversity, it can suppress the interference component to other sectors adjacent to the transmitting sector, and the interference component to adjacent cells.

On the other hand, while soft-combining can additionally increase the signal component since it transmits identical data from both sectors at identical timings, in comparison with when not using macrodiversity, it cannot reduce the interference components to adjacent sectors and adjacent cells.

At the mobile station device 2, there are cases where deterioration in the received SINR is mainly caused by increase in the interference component, and it is possible to realize a requested transmission rate by using fast sector selection with transmission muting to suppress the interference component, and to apply a modulation scheme having the largest modulation value among applicable modulation schemes. On the other hand, at the mobile station device 2, there are cases where deterioration in the received SINR is caused both by deterioration in the signal component and increase in the interference component, and it is not possible to realize a requested transmission rate without using soft-combining to suppress the interference component while increasing the signal component. These states will be explained in detail with reference to FIG. 23.

FIG. 23 is a diagram of fluctuation in the received SINR of mobile station devices in sectors. The received SINR shown here represents an average value over time, rather than a momentary value that changes due to fading and the like. Mobile station device 2a is located in a middle region between two sector edges (here, a middle region between the sector edge of sectors #1 and #2 and the sector edge of sectors #1 and #3), at a point (area A) nearer to the base station device 1 than a middle point between the cell edge of the base station device 1 and the base station device 1; this mobile station device 2a has a large signal component from the base station device 1, low interference component from sector #2 and other cells, and high received SINR.

Mobile station device 2b is located in a middle region between two sector edges, at a middle point (area B) between the cell edge of the base station device 1 and the base station device 1, and, in comparison with mobile station device 2a in area A, has a reduced signal component from the base station device 1, and a deteriorated received SINR.

Mobile station device 2c is located in a middle region between two sector edges, at a point (area C) further from the base station device 1 than the middle point between the cell edge of the base station device 1 and the base station device 1, and, in comparison with mobile station device 2a in area A, has a reduced signal component from the base station device 1, increased interference component from other cells, and a greatly deteriorated received SINR.

Mobile station device 2d is located in a region between two sectors (here, the region of the sector edge of sector #1 and sector #2), at a point (area D) nearer to the base station device 1 than the middle point between the cell edge of the base station device 1 and the base station device 1, and, in comparison with mobile station device 2a in area A, has a greatly reduced interference component from another sector (here, sector #2), and a greatly deteriorated received SINR.

Mobile station device 2e is located in a region between two sectors, at a point (area E) further from the base station device 1 than the middle point between the cell edge of the base station device 1 and the base station device 1, and, in comparison with the mobile station device 2a in area A, has a greatly reduced signal component from the base station device 1, increased interference component from other cells and another sector (here, sector #2), and a deteriorated received SINR. That is, the mobile station device 2d in area D enhances its received SINR by reducing the interference component from other sectors. However, if the mobile station device 2e in area E merely reduces the interference component from other sectors, it obtains only a slight increase in the received SINR; it is therefore necessary to increase the signal component.

DISCLOSURE OF THE INVENTION

The present invention has been realized in view of the above circumstances, and aims to provide a wireless communication system that can increase cell throughput and system throughput during wireless communication, a base station device, a mobile station device, and a macrodiversity selection method.

It is an object of the invention to solve the above problems.

A base station device according to a first aspect of the invention includes a macrodiversity function between a plurality of sectors that selects, in accordance with a predetermined determination reference based on reception conditions of a mobile station device, a macrodiversity method to be used with respect to the mobile station device from among a plurality of macrodiversity methods.

In a base station device according to a second aspect of the invention, the base station device of the first aspect selects one of a first macrodiversity method of transmitting a signal created from identical information in a plurality of sectors from the sectors, and a second macrodiversity method of transmitting signal created from different information in a plurality of sectors from the sectors such as to suppress interference to an arbitrary sector, in accordance with a predetermined determination reference based on reception conditions of the mobile station device.

In a base station device according to a third aspect of the invention, the base station device of the second aspect detects the location of the mobile station device and, when the mobile station device is located at a sector edge near the center of a cell, selects the second macrodiversity method, and, when the mobile station device is located at a sector edge near a cell edge, selects the first macrodiversity method.

In a base station device according to a fourth aspect of the invention, the base station device of the second aspect selects whether to use macrodiversity based the reception power of a self sector, being a sector connected at the mobile station device, and the difference between the reception powers of the self sector and another sector, being one which is not connected at the mobile station device, and selects a macrodiversity method to be used.

In a base station device according to a fifth aspect of the invention, the base station device of the second aspect selects whether to use macrodiversity based on the reception power of the self sector at the mobile station device, and a received signal to interference plus noise ratio of the self sector, and selects a macrodiversity method to be used.

In a base station device according to a sixth aspect of the invention, the base station device of the second aspect selects whether to use macrodiversity based on the reception power of the self sector at the mobile station device, and the difference between the received signal to interference plus noise ratios of the self sector and another sector, and selects a macrodiversity method to be used.

In a base station device according to a seventh aspect of the invention, the base station device of the one of the fourth to sixth aspects further selects whether to use macrodiversity based on the difference in reception powers between the self sector and an adjacent cell, and selects a macrodiversity method to be used.

In a base station device according to an eighth aspect of the invention, the base station device of the one of the fourth to sixth aspects further selects whether to use macrodiversity based on the reception power of an adjacent cells, and selects a macrodiversity method to be used.

In a base station device according to a ninth aspect of the invention, the base station device of the second aspect selects whether to use macrodiversity based on the received signal to interference plus noise ratio of an adjacent cell at the mobile station device, and the received signal to interference plus noise ratio of the self sector, and selects a macrodiversity method to be used.

In a base station device according to a tenth aspect of the invention, the base station device of the second aspect selects whether to use macrodiversity based on the received signal to interference plus noise ratio of an adjacent cell at the mobile station device, and the difference between the received signal to interference plus noise ratios of the self sector and another sector, and selects a macrodiversity method to be used.

In a base station device according to an eleventh aspect of the invention, the base station device of one of the second to tenth aspects uses soft-combining, being a method of transmitting signals that are identical among the sectors, as the first macrodiversity method.

In a base station device according to a twelfth aspect of the invention, the base station device of one of the second to tenth aspects uses space time transmit diversity, being a method of transmitting signals that are encoded by space-time encoding between the sectors, as the first macrodiversity method.

In a base station device according to an thirteenth aspect of the invention, the base station device of one of the second to tenth aspects uses, as the first macrodiversity method, a method of calculating a transmit weight based on channel information of the mobile station device in each sector, and transmitting a signal after multiplying the calculated weight with each sector.

In a base station device according to a fourteenth aspect of the invention, the base station device of one of the second to tenth aspects uses, as the second macrodiversity method, fast sector selection with transmission muting, being a method that transmits a signal only from an arbitrary sector and does not transmit from remaining sectors.

In a base station device according to a fifteenth aspect of the invention, the base station device of one of the second to tenth aspects uses, as the second macrodiversity method, a method of transmitting a signal at normal transmission power only from an arbitrary sector, and transmits at reduced transmission power from remaining sectors.

In a base station device according to a sixteenth aspect of the invention, the base station device of the eleventh aspect selects a macrodiversity method based on channel phase information from the base station device to the mobile station device, selecting the second macrodiversity method when the channel phase difference is greater than a predetermined threshold, and selecting soft-combining when it is smaller than the predetermined threshold.

A mobile station device according to a seventeenth aspect of the invention transmits a selection request signal for a first macrodiversity method and a second macrodiversity method to the base station device of the second aspect.

A mobile station device according to an eighteenth aspect of the invention transmits at least one of the reception power of another sector at the mobile station device and the difference between the reception powers of the self sector and the other sector, and the reception power of the self sector, to the base station device of the second aspect.

A mobile station device according to a nineteenth aspect of the invention transmits the received signal to interference plus noise ratio of the self sector at the mobile station device, and the reception power of the self sector, to the base station device of the fifth aspect.

A mobile station device according to a twentieth aspect of the invention transmits at least one of (a) the received signal to interference plus noise ratio of the self sector at the mobile station device and the received signal to interference plus noise ratio of the other sector, and (b) the difference between the received signal to interference plus noise ratios of the self sector and the other sector, and the reception power of the self sector, to the base station device of the sixth aspect.

In a mobile station device according to a twenty-first aspect of the invention, the mobile station device of one of the eighteenth to twentieth aspects further transmits the difference between the reception power of the self sector and an adjacent cell to the base station device of the seventh aspect.

In a mobile station device according to a twenty-second aspect of the invention further transmits the reception power of the adjacent cell to the base station device according to claim 7.

A mobile station device according to a twenty-third aspect of the invention transmits the received signal to interference plus noise ratio of a self sector in the mobile station device, and the received signal to interference plus noise ratio of an adjacent cell, to the base station device of the seventh aspect.

A mobile station device according to a twenty-fourth aspect of the invention transmits at least one of (a) the received signal to interference plus noise ratio of the self sector at the mobile station device and the received signal to interference plus noise ratio of the other sector, and (b) the difference between the received signal to interference plus noise ratios of the self sector and the other sector, and the received signal to interference plus noise ratio of an adjacent cell, to the base station device of the tenth aspect.

In a mobile station device according to a twenty-fifth aspect of the invention, the mobile station device of one of the eighteenth to twenty-fourth aspects extracts a phase difference between channels of the self sector and the other sector, and transmits it to the base station device of the sixteenth aspect.

A mobile station device according to a twenty-sixth aspect of the invention selects whether to use macrodiversity in the base station device of one of the fourth to tenth and sixteen aspects, selects a macrodiversity method to be used, and transmits a selection request signal for the first macrodiversity method and the second macrodiversity method to the base station device.

A macrodiversity selection method according to a twenty-seventh aspect of the invention is a method of selecting a first macrodiversity method of transmitting a signal created from identical information in a plurality of sectors from the sectors, and a second macrodiversity method of transmitting signal created from different information in a plurality of sectors from the sectors such as to suppress interference to an arbitrary sector, in accordance with a predetermined determination reference based on reception conditions of the mobile station device.

In a macrodiversity selection method according to a twenty-eighth aspect of the invention, the macrodiversity selection method of the twenty-seventh aspect selects whether to use macrodiversity based on the reception power of the self sector, being the connected sector, and on the difference between the reception powers of the self sector and another sector, and selects a macrodiversity method to be used.

In a macrodiversity selection method according to a twenty-ninth aspect of the invention, the macrodiversity selection method of the twenty-seventh aspect selects whether to use macrodiversity based on the reception power of the self sector, being the connected sector, and on the received signal to interference plus noise ratio of the self sector, and selects a macrodiversity method to be used.

In a macrodiversity selection method according to a twenty-eighth aspect of the invention, the macrodiversity selection method of the twenty-seventh aspect selects whether to use macrodiversity based on the reception power of the self sector, being the connected sector, and the difference between the received signal to interference plus noise ratios of the self sector and another sector, and selects a macrodiversity method to be used.

In a macrodiversity selection method according to a thirty-first aspect of the invention, the macrodiversity selection method of one of the twenty-eighth to thirtieth aspects further selects whether to use macrodiversity based on the difference between the reception powers of the self sector and an adjacent cell, and selects a macrodiversity method to be used.

In a macrodiversity selection method according to a thirty-second aspect of the invention, the macrodiversity selection method of one of the twenty-eighth to thirtieth aspects further selects whether to use macrodiversity based on the reception power of an adjacent cells, and selects a macrodiversity method to be used.

In a macrodiversity selection method according to a thirty-third aspect of the invention, the macrodiversity selection method of the twenty-seventh aspect selects whether to use macrodiversity based on the received signal to interference plus noise ratio of an adjacent cell, and the received signal to interference plus noise ratio of the self sector, and selects a macrodiversity method to be used.

In a macrodiversity selection method according to a thirty-fourth aspect of the invention, the macrodiversity selection method of the twenty-seventh aspect selects whether to use macrodiversity based on the received signal to interference plus noise ratio of an adjacent cell, and the difference between the received signal to interference plus noise ratios of the self sector and another sector, and selects a macrodiversity method to be used.

In a macrodiversity selection method according to a thirty-fifth aspect of the invention, the macrodiversity selection method of one of the twenty-eighth to thirty-fourth aspects transmits, based on channel phase information from the base station device to the mobile station device, when the channel phase difference is greater than a predetermined threshold, selects the second macrodiversity method that transmits a signal created from different information in a plurality of sectors from the sectors such as to suppresses interference to an arbitrary sector, and, when the channel phase difference is smaller than the predetermined threshold, selects soft-combining as a first macrodiversity method that transmits signals that are identical among the sectors.

A wireless communication system according to a thirty-sixth aspect of the invention selects macrodiversity using the macrodiversity selection method of one of the twenty-seventh to thirty-fifth aspects at a base station device or a mobile station device.

In the present invention, a macrodiversity method to be used for a mobile station device is selected from a plurality of macrodiversity methods in accordance with a predetermined determination reference based on reception conditions of the mobile station device.

Therefore, in accordance with the conditions of the mobile station device, by using fast sector selection with transmission muting as the macrodiversity method, interference by signals transmitted from other sectors can be prevented, and, by using soft-combining an the macrodiversity method, interference by signals transmitted from other sectors can be prevented and the reception strength of the signal can be adaptively increased, whereby cell throughput of a cell having a plurality of sector and system throughput of a system having a plurality of cells can be enhanced.

BEST MODE FOR CARRYING OUT THE INVENTION

First Embodiment

Figure 1:
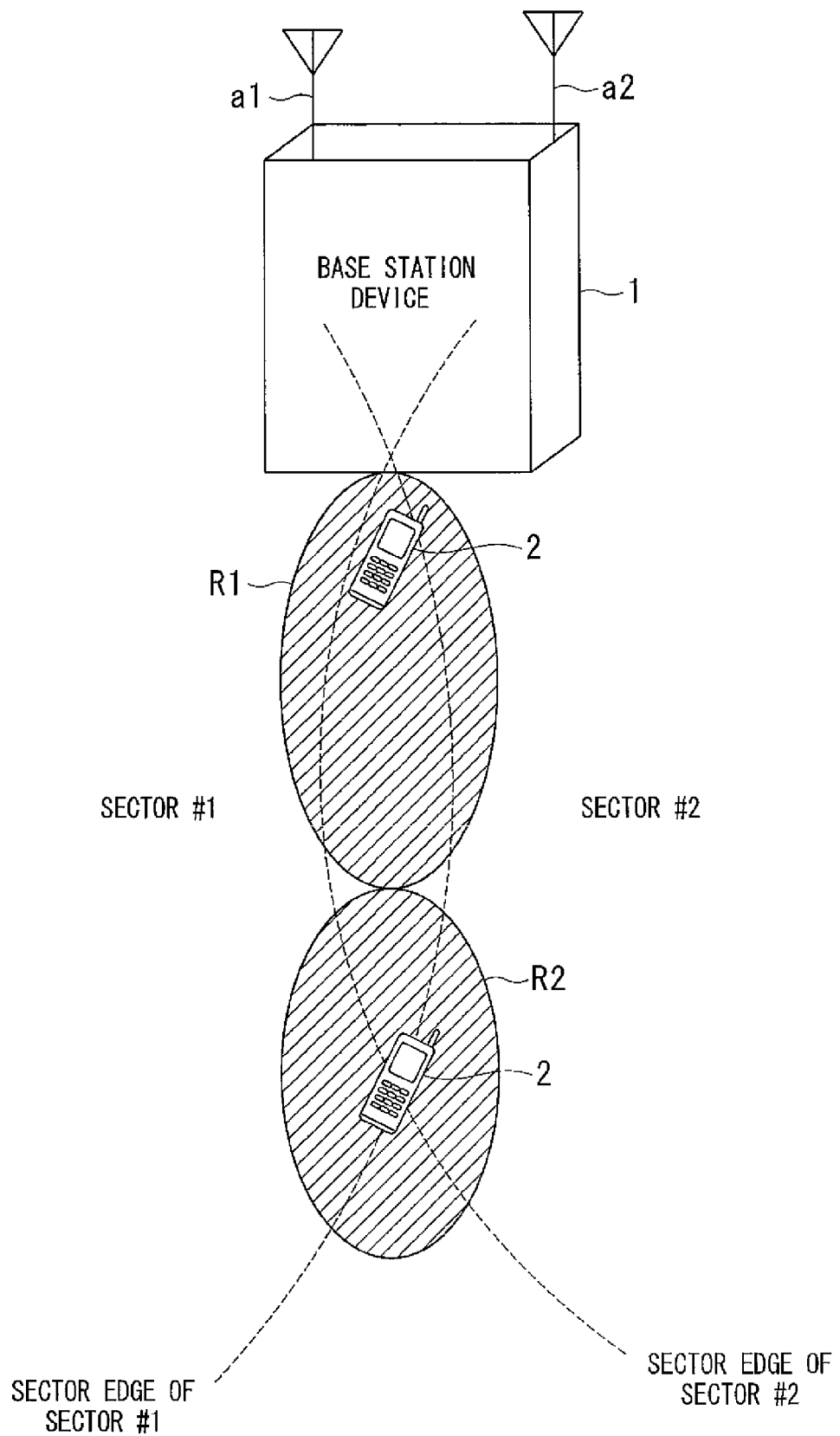
FIG. 1 is a conceptual diagram of a macrodiversity selection method according to a first embodiment of the invention.

FIG. 1 is a conceptual view of a macrodiversity selection method according to a first embodiment of the invention. In this embodiment, when a mobile station device 2 is located at a sector edge, which is a region at the interface between sector #1, which is a region that transmits a signal from antenna a1, and sector #2, which is a region that transmits a signal from antenna a2, in a region R1 (sector edge near cell center) where the distance between the mobile station device 2 and a base station device 1 is less than a predetermined threshold, fast sector selection with transmission muting is employed. When the mobile station device 2 is located in a region R2 near the cell edge (sector edge near cell edge) where the distance between it and the base station device 1 is greater than the predetermined threshold, soft-combining is employed. A sector edge is a region at the interface between two sectors (regions R1 and R2 in FIG. 1). A cell edge is a region at the interface between two cells (the region in the bottom half of region R2 in FIG. 1).

Figure 2:
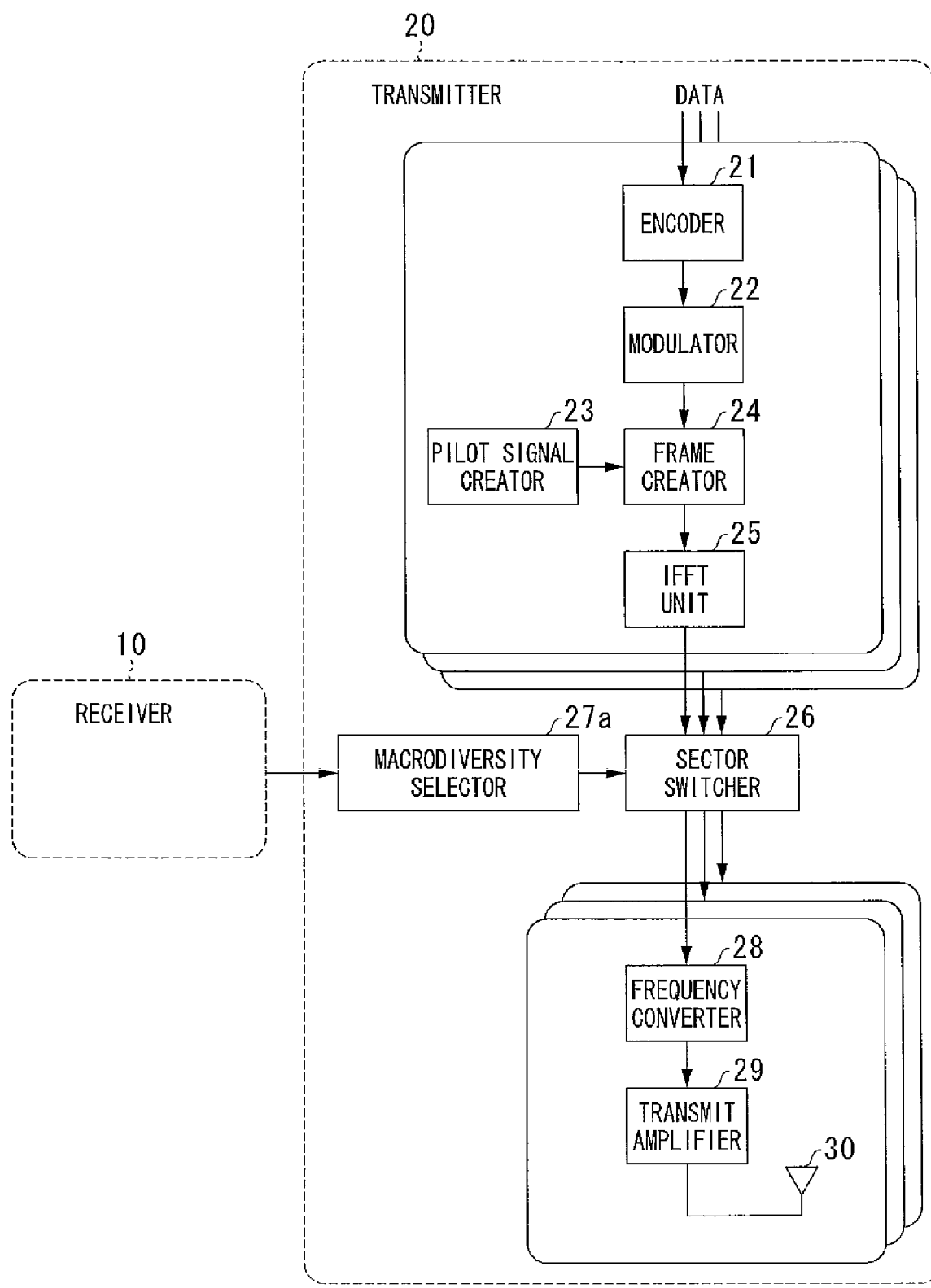
FIG. 2 is a block diagram of the configuration of a base station device according to a first embodiment of the invention.

FIG. 2 is a block diagram of the configuration of a base station device according to the first embodiment of the invention. This base station includes a receiver 10 and a transmitter 20.

The mobile station device 2 (FIG. 1) reports information such as positional information, reception power, and received SINR to the receiver 10. The transmitter 20 includes an encoder 21, a modulator 22, a pilot signal creator 23, a frame creator 24, an inverse fast Fourier transform (IFFT) unit 25, a sector switcher 26, a macrodiversity selector 27a, a frequency converter 28, a transmit amplifier 29, and a transmit antenna 30. Three groups of these devices are provided for three sectors of the base station device.

The encoder 21 encodes an input data signal. The modulator 22 modulates an encoded data signal. The pilot signal creator 23 creates a pilot signal that is a known stream for channel estimation and the like. The frame creator 24 uses the pilot signal and the modulated data signal to create a transmit frame.

The IFFT unit 25 performs an inverse fast Fourier transform process, and converts the transmit frame from a frequency domain signal to a time domain signal. Based on sector selection control information from the macrodiversity selector 27a, the sector switcher 26 outputs a time domain signal from each IFFT unit 25 to the each frequency converter 28.

The macrodiversity selector 27a determines, based on the positional information and the reception power reported from the mobile station device 2 (FIG. 1), whether to use macrodiversity between the sectors, selects a macrodiversity method to be used, and outputs sector selection control information. The macrodiversity selector 27a determine whether to use macrodiversity, and select a macrodiversity method to be used, based on received SINR instead of reception power, or based on both reception power and received SINR.

The frequency converter 28 makes a frequency conversion of a time domain signal. The transmit amplifier 29 amplifies the frequency-converted signal, and transmits the signal via the transmit antenna 30.

Figure 3:
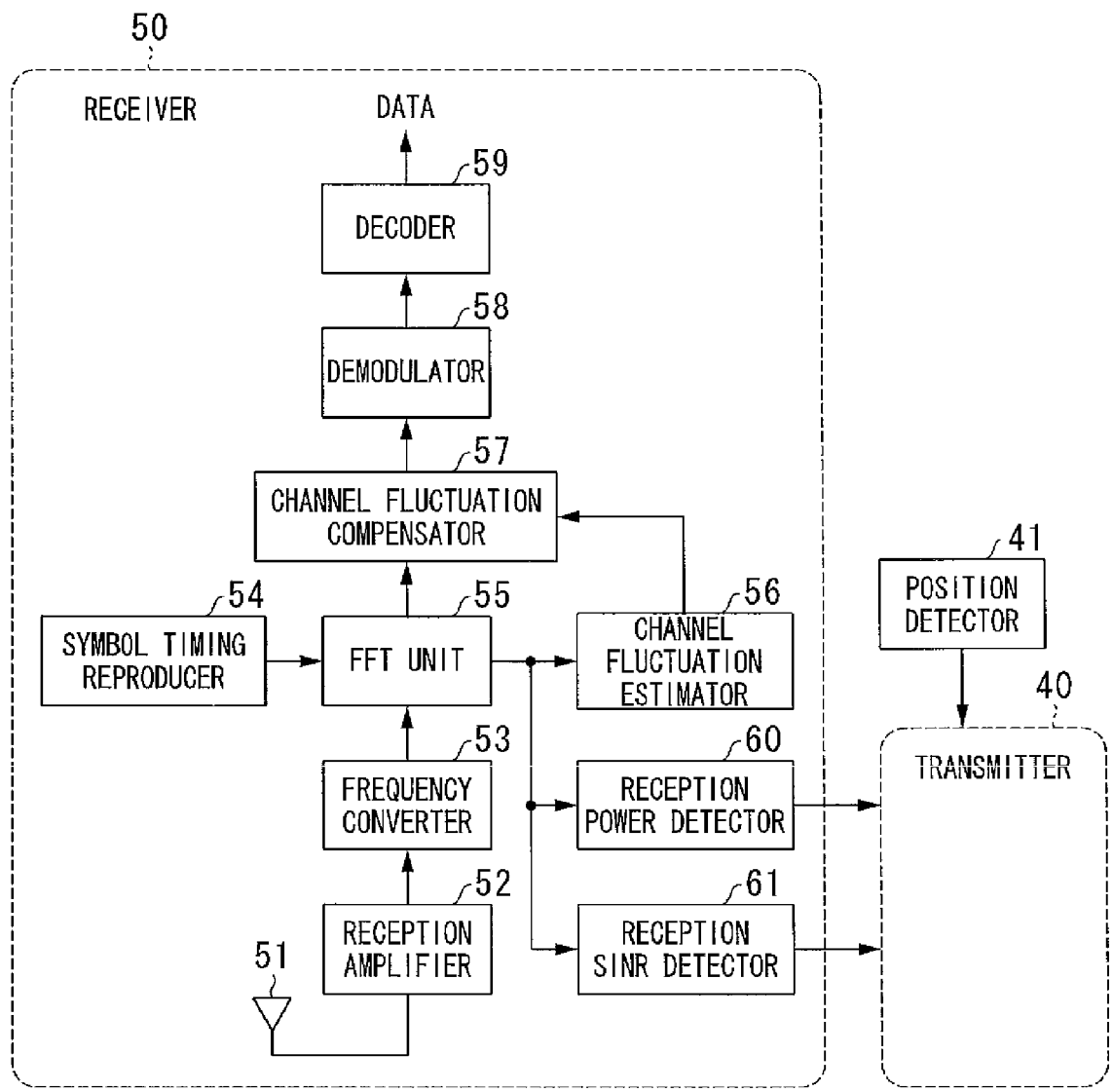
FIG. 3 is a block diagram of the configuration of a base station device according to the first embodiment of the invention.

FIG. 3 is a block diagram of the configuration of a mobile station device according to the first embodiment, This mobile station device includes a transmitter 40 and a receiver 50.

The receiver 50 includes a reception antenna 51, a reception amplifier 52, a frequency converter 53, a symbol timing reproducer 54, a fast Fourier transform (FFT) unit 55, a channel fluctuation estimator 56, a channel fluctuation compensator 57, a demodulator 58, a decoder 59, and a reception power detector 60.

The reception amplifier 52 amplifies a signal received via the reception antenna 51. The frequency converter 53 makes a frequency conversion of the amplified signal. The symbol timing reproducer 54 reproduces a timing for applying a fast Fourier transform (FFT) window from the output of the frequency converter 53, and outputs timing control information to the FFT unit 55.

Based on the timing control information, the FFT unit 55 performs a fast Fourier transform process, and converts the time domain signal to a frequency domain signal. The channel fluctuation estimator 56 estimates channel fluctuation from the pilot signal converted to a frequency domain signal. Based on the channel fluctuation estimated by the channel fluctuation estimator 56, the channel fluctuation compensator 57 compensates the channel fluctuation of the data signal converted to a frequency domain signal.

The demodulator 58 demodulates the data signal whose channel fluctuation was compensated. The decoder 59 decodes the demodulated data signal, and outputs data to an upper level (not shown) of the receiver 50. The reception power detector 60 detects the reception power from the pilot signal that was converted to the frequency domain. The reception power detector 60 detects reception power using a pilot signal from each sector.

A position detector 41 detects the position of the mobile station device 2 (FIG. 1) using, for example, global positioning system (GPS). Since the signal transmitted from the base station device 1 (FIG. 1) attenuates in accordance with the distance from the base station device 1, the position detector 41 can detect the position of the mobile station device 2 based on the attenuation amount of the reception strength of the signal received from the base station device 1. Using the transmitter 40, the mobile station device 2 feeds the detected positional information and reception power of each sector back to the base station device 1. When the base station device 1 employs received SINR for macrodiversity selection, the mobile station device 2 is provided with a received SINR detector 61 which detects the received SINR and feeds it back to the base station device 1. Cases when the base station device 1 employs received SINR for macrodiversity selection include using only received SINR, and using both reception power and received SINR.

Figure 4:
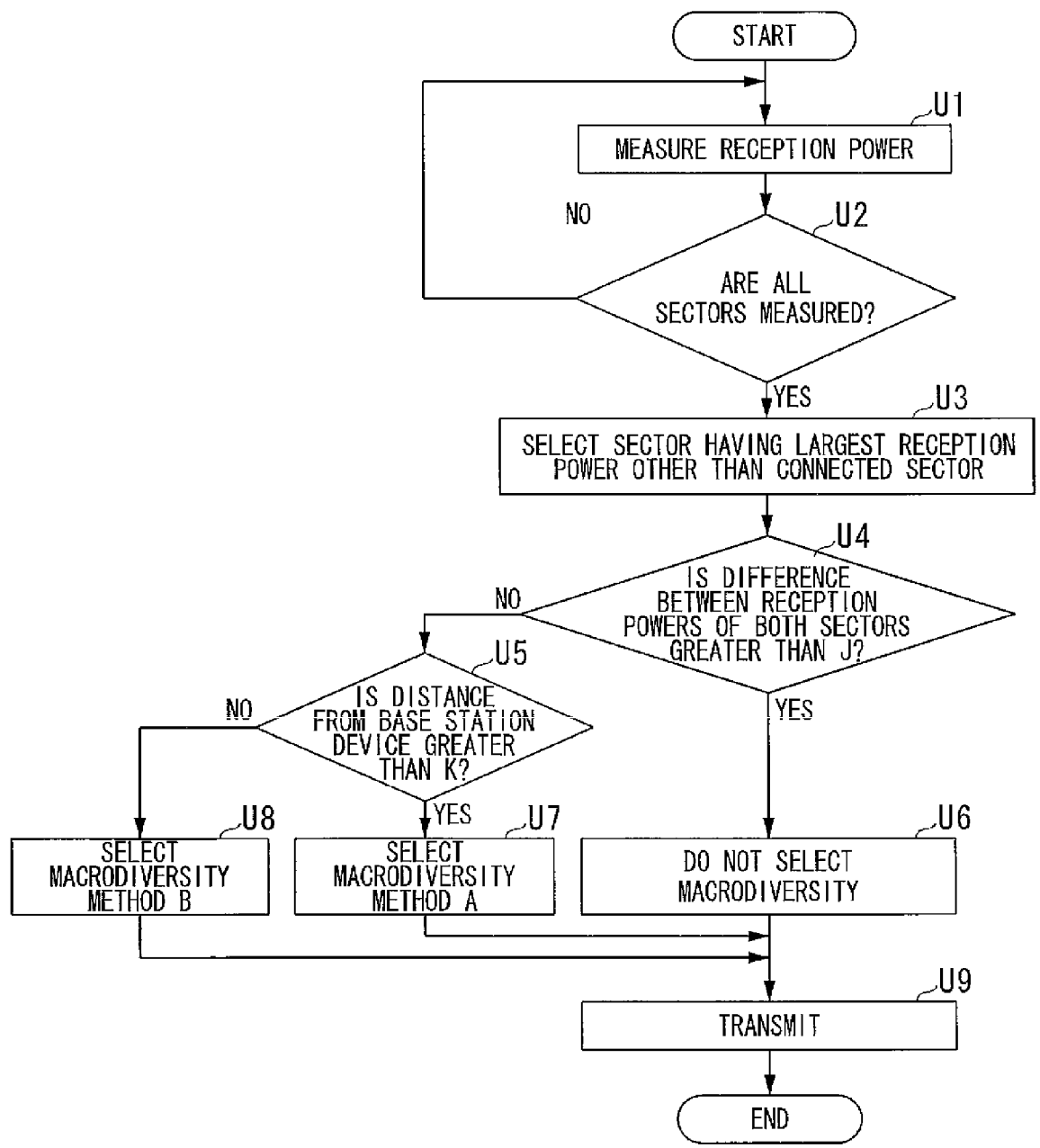
FIG. 4 is a flowchart of the flow of processes of a macrodiversity selection method according to a first embodiment of the invention.

FIG. 4 is a flowchart of the flow of processes of a macrodiversity selection method according to a first embodiment of the invention. Firstly, the reception power of the pilot signal is measured at the mobile station device 2 (step U1). It is then determined whether measuring has ended for all sectors (step U2). 'All sectors' includes sectors in the self cell and sectors in other cells.

When measuring has not ended, the process returns to step U1 and the reception power is measured. When measuring has ended, a sector having the largest reception power among the sectors in the self cell, other than the connection sector in the present communication, is selected as a macrodiversity candidate sector (step U3). Then, based on the reception power fed back by the mobile station device 2, the base station device 1 determines whether the difference between the reception powers of the connection sector and the selected sector is greater than a predetermined threshold J (step U4). Step U4 can determine whether the mobile station device 2 is located near the sector edge.

When it is determined in step U4 that the difference is greater than the predetermined threshold, the base station device 1 determines that the mobile station device 2 is far from the sector edge and selects not to use macrodiversity (step U6). The process of step U6 is performed when, for example, the mobile station device 2 is located in any of the regions of areas A, B, and C in FIG. 7 described later.

When it is determined in step U4 that the difference is not greater than the predetermined threshold, the base station device 1 determines that the mobile station device 2 is near the sector edge, and, based on the positional information reported from the mobile station device 2, determines whether the distance of the mobile station device 2 from the base station device 1 is greater than a predetermined distance K (step U5). Steps U4 and U5 can determine whether the mobile station device 2 is located at a sector edge near a cell edge, or at a sector edge near the base station device 1.

When it is determined in step U5 that the distance is greater than the predetermined distance K, the base station device 1 determines that the mobile station device 2 is far from the base station device 1. It then selects macrodiversity method A (e.g. soft-combining) that transmits identical signals among the sectors. The process of step U7 is performed when, for example, the mobile station device 2 is located in a region of area F in FIG. 7 described later.

When it is determined in step U5 that the distance is not greater than the predetermined distance K, the base station device 1 determines that the mobile station device 2 is near the base station device 1. It then selects macrodiversity method B (e.g. fast sector selection with transmission muting) which transmits only from one sector and not from the remaining sectors (step U8). The process of step U8 is executed when, for example, the mobile station device 2 is located in a region of area D in FIG. 7 described later.

Subsequently, the base station device 1 performs transmission using the selected method (step U9).

As described above, since the macrodiversity method is selected in accordance with positional information of the mobile station device 2, it is possible to perform an appropriate macrodiversity transmission that considers reception characteristics of the mobile station device 2 and interference with other cells and sectors.

Second Embodiment

Figure 5:
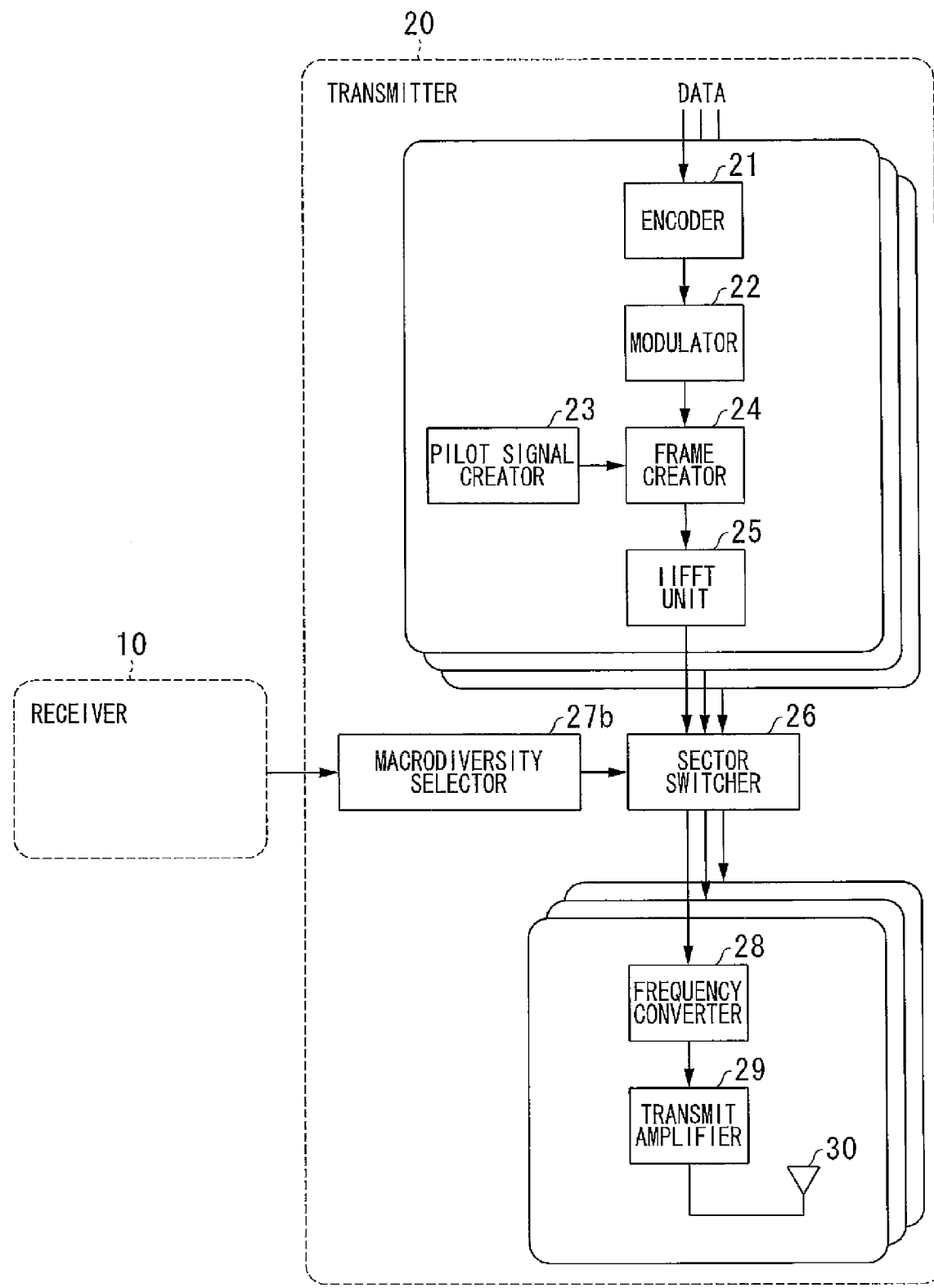
FIG. 5 is a block diagram of the configuration of a base station device according to a second embodiment of the invention.

FIG. 5 is a block diagram of the configuration of a base station device according to a second embodiment of the invention. Like parts to those of the configuration of the base station device according to the first embodiment (FIG. 2) are denoted by like reference numerals and are not repetitiously explained. Points of difference with the base station device 1 according to the first embodiment are that positional information is not fed back by the mobile station device 2, and that the processing content of a macrodiversity selector is different. Based on the reception power or the received SINR, a macrodiversity selector 27b determines whether to use macrodiversity between sectors, selects a macrodiversity method for use, and outputs sector selection control information.

Figure 6:
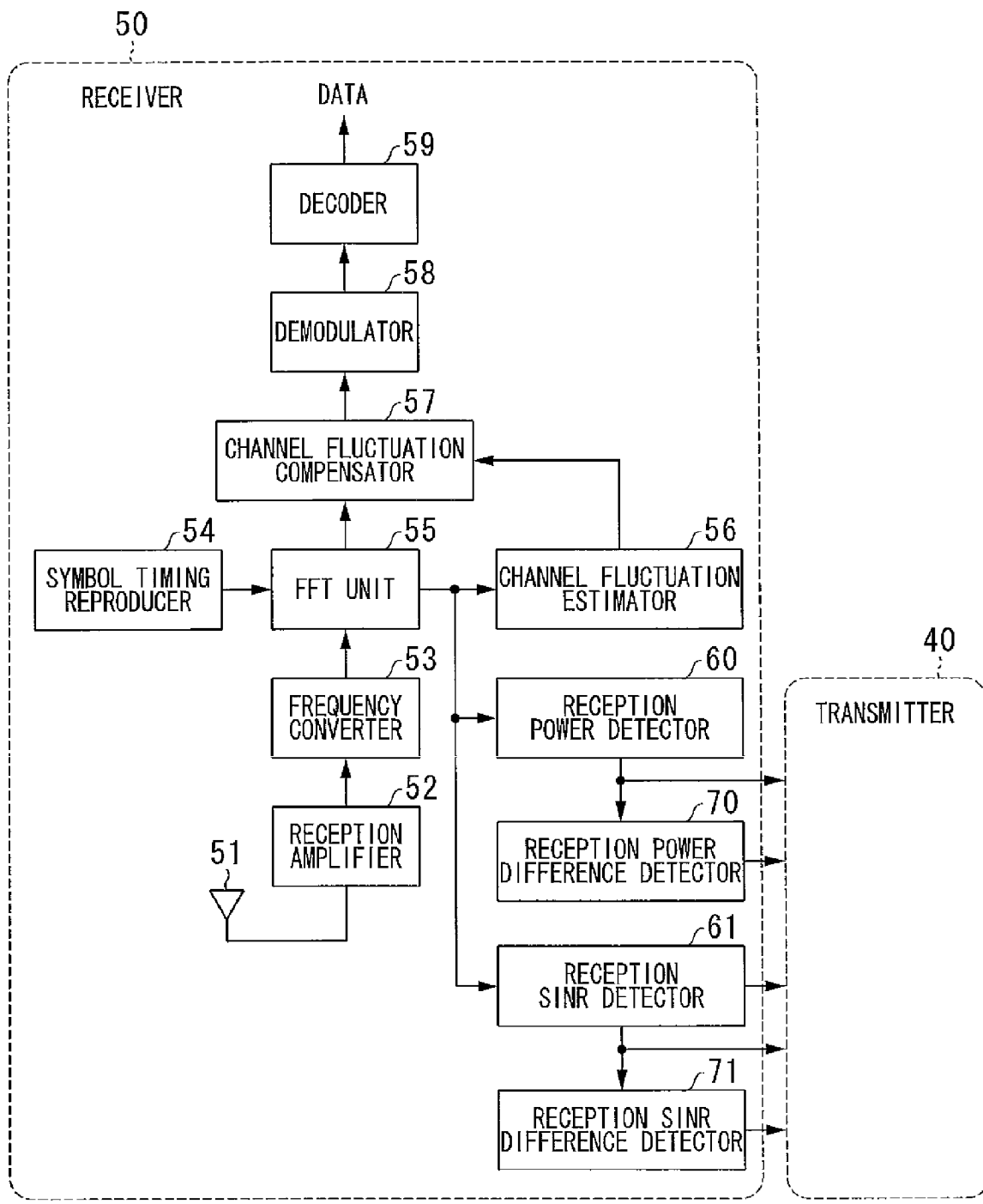
FIG. 6 is a block diagram of the configuration of a base station device according to a second embodiment of the invention.

FIG. 6 is a block diagram of the configuration of a mobile station device according to the second embodiment. Like parts to those of the configuration of the mobile station device according to the first embodiment (FIG. 3) are denoted by like reference numerals and are not repetitiously explained. Points of difference with the mobile station device 2 according to the first embodiment are that a position detector 41 is not provided, and that a reception power difference detector 70 and a received SINR difference detector 71 are provided.

The configuration of the mobile station device 2 of FIG. 6 need not include all of the reception power detector 60, the received SINR detector 61, the reception power difference detector 70 and the received SINR difference detector 71. In second to seventh embodiments described below, depending on which macrodiversity selection method is being used, the mobile station device 2 can be provided with only the required detectors from among the reception power detector 60, the received SINR detector 61, the reception power difference detector 70, and the received SINR difference detector 71, and information relating to only one of reception power and received SINR can be reported to the base station device 1.

The configuration can also be one where the mobile station device 2 reports the actual reception power difference or received SINR difference to the base station device 1, or where the mobile station device 2 reports the reception power of each sector to the base station device 1, and the reception power difference is then calculated.

If the mobile station device 2 can detects the reception power and the received SINR of all sectors and adjacent cells, and reports them to the base station device 1, the base station device 1 can use all macrodiversity selection methods.

On the other hand, if the mobile station device 2 reports only the information for use from the reception power and the received SINR to the base station device 1, the amount of reported information can be reduced and the macrodiversity method can be selected efficiently.

The second embodiment uses reception power and received SINR to select a macrodiversity method from the reception characteristics that fluctuate in accordance with the reception state of the mobile station device 2. The reception state includes the position of the mobile station device 2. For a background point, the mobile station device 2 indicates, in accordance with its position, what kind of reception characteristics are exhibited by signals received from a plurality of sectors. These reception characteristics indicate fluctuation differences of the reception power and the received SINR. Here, reception characteristics represent an average value over time, and not a momentary value that changes due to fading etc.

Figure 7:
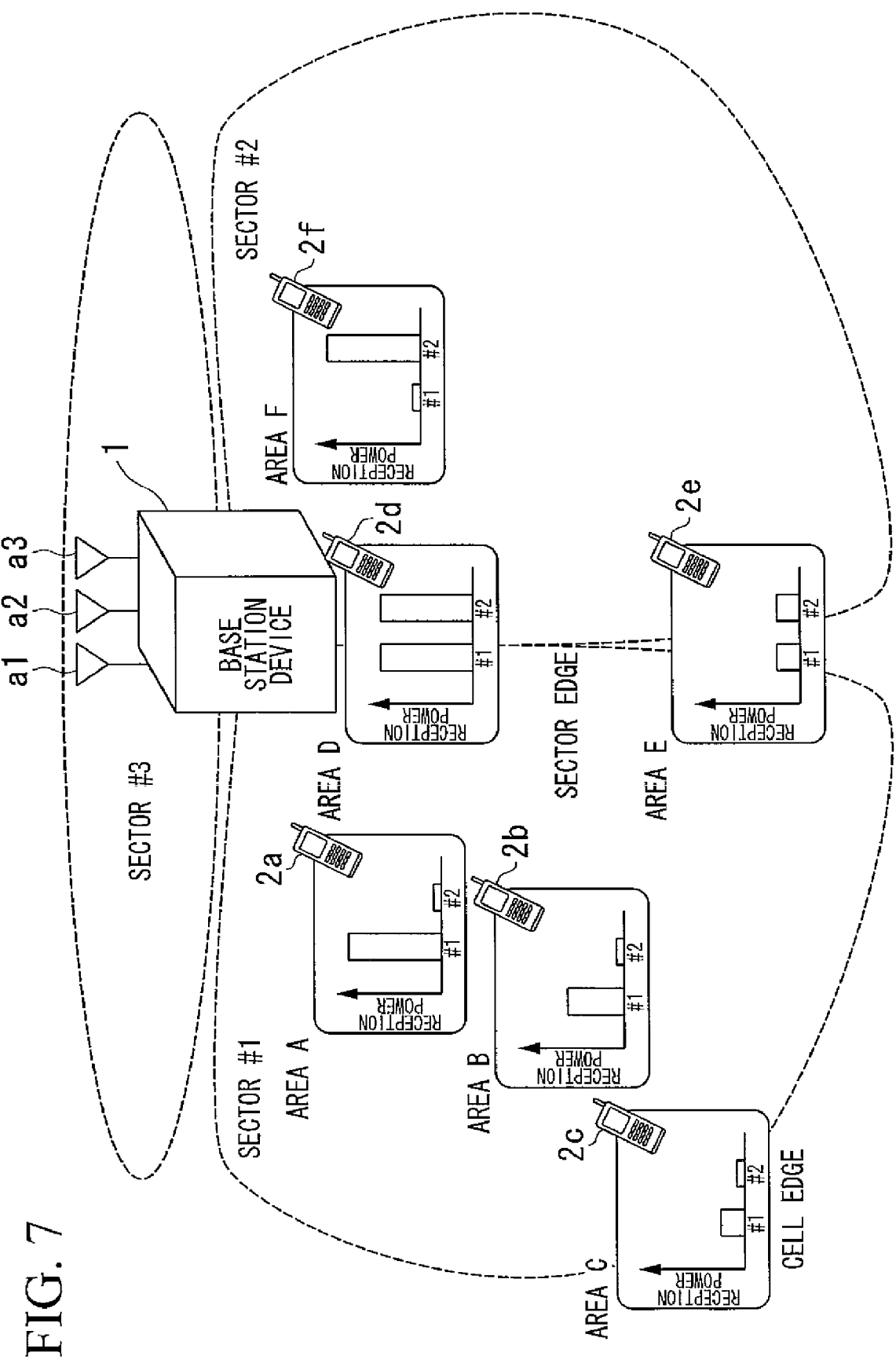
FIG. 7 is a diagram of fluctuation in reception power of a mobile station device in sectors.

FIG. 7 is a diagram of fluctuation in the reception power of mobile station devices in sectors. In this example, a cell that transmits a signal from a base station 1 includes three sectors (sectors #1, #2, and #3). For sake of convenience, the reception power of signals from sector #1 and sector #2 will be explained.

A mobile station device 2a located in a middle region between two sector edges (here, a middle region between sector edge of sector #1 and sector #2, and sector edge of sectors #1 and #3) termed area A, which is a point nearer to the base station device 1 than a middle point between the cell edge of the base station device 1 and the base station device 1, has extremely high reception power from sector #1 and extremely low reception power from sector #2.

A mobile station device 2b located in a middle region between two sector edges termed area B, which is a middle point between the cell edge of the base station device 1 and the base station device 1, has fairly high reception power from sector #1 and extremely low reception power from sector #2. In comparison with the mobile station device 2a in area A, the mobile station device 2b in area B has somewhat reduced reception power from sector #1.

A mobile station device 2c located in a middle region between two sector edges termed area A, which is a point further from the base station device 1 than a middle point between the cell edge of the base station device 1 and the base station device 1, has low reception power from sector #1 and extremely low reception power from sector #2.

In comparison with the mobile station device 2a, the mobile station device 2c in area C has greatly reduced reception power from sector #1.

A mobile station device 2d located in a region between two sectors (here, the region of the sector edge between sector #1 and sector #2) termed area D, which is a point nearer the base station device 1 than a middle point between the cell edge of the base station device 1 and the base station device 1, has extremely high reception power from sector #1 and extremely high reception power from sector #2. In comparison with the mobile station device 2a in area A, the mobile station device 2d in area D has greatly increased reception power from sector #2. Area D corresponds to a sector edge near the cell center.

A mobile station device 2e located in a region between two sectors termed area E, which is a point further from the base station device 1 than a middle point between the cell edge of the base station device 1 and the base station device 1, has low reception power from sector #1 and also low reception power from sector #2. In comparison with the mobile station device 2a in area A, the mobile station device 2e in area E has greatly reduced reception power from sector #1. Area E corresponds to a sector edge near the cell edge.

A mobile station device 2f located in the center in the circumferential direction of sector #2 centered around the base station device 1, at a point near the base station device 1 in the diameter direction (area F), has extremely low reception power from sector #1 and extremely high reception power from sector #2. In comparison with the mobile station device 2a in area A, the mobile station device 2f in area F has greatly reduced reception power from sector #1 and greatly increased reception power from sector #2. That is, the reception power depends on the distance from the base station device 1, and also on the directionality of the sector antennas a1 to a3.

Figure 8:
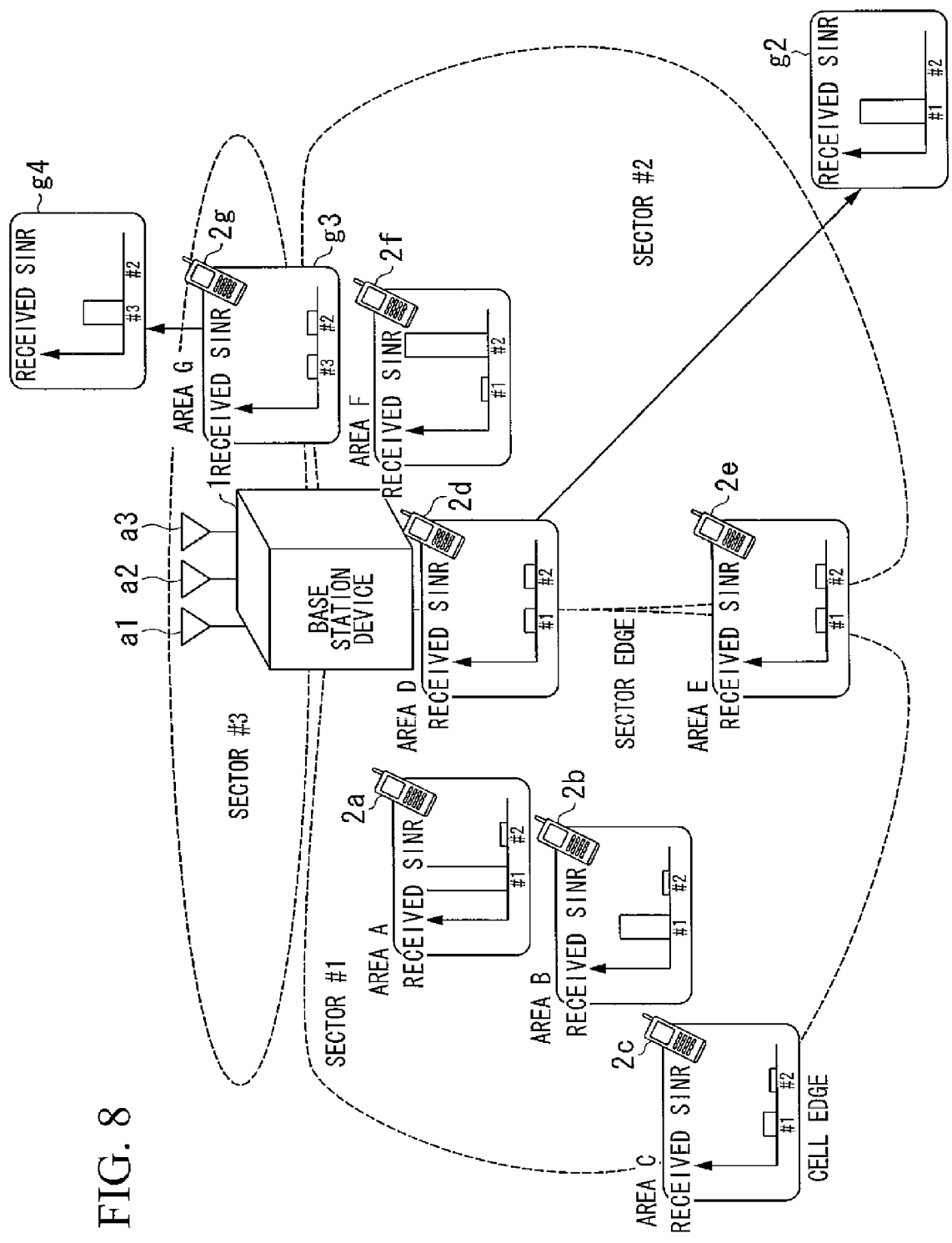
FIG. 8 is a diagram of fluctuation in received SINR of a mobile station device in sectors.

FIG. 8 is a diagram of fluctuations in received SINR of mobile station devices in sectors. As in the explanation of FIG. 7, a cell that transmits a signal from a base station 1 includes three sectors (sectors #1, #2, and #3) will be explained. For sake of convenience, the reception power of signals from sector #1 and sector #2 will be explained. Since received SINR is the ratio between the signal component and the sum of the interference component and noise component, it fluctuates according to the size of the signal component of the self sector and the signal component of the other sector. That is, since it fluctuates according to the size of the reception power mentioned above, it is dependent on the reception power from the sectors #1 to #3 in FIG. 8. The mobile station device 2a in area A has extremely high received SINR for sector #1 and extremely low received SINR for sector #2.

The mobile station device 2b located in area B has fairly high received SINR for sector #1 and extremely low received SINR for sector #2. In comparison with the mobile station device in area A, the mobile station device 2b in area B has fairly reduced received SINR for sector #1. The mobile station device 2c in area C has low received SINR for sector #1 and extremely low received SINR for sector #2. In comparison with the mobile station device 2a in area A, the mobile station device 2c in area C has greatly reduced received SINR for sector #1. It suffers increased interference from other cells, and its received SINR deteriorates.

The mobile station device 2d in area D has extremely low received SINR for sector #1, and extremely low received SINR for sector #2. In comparison with the mobile station device 2a in area A, it has greatly reduced received SINR for sector #2. This deterioration, which occurs in spite of the extremely large signal component from sector #1, is due to the extremely large interference component from sector #2. By using fast sector selection with transmission muting to stop transmission from sector #2, and suppress the interference component applied to sector #1, the received SINR changes from graph g1 to graph g2, and the received SINR of sector #1 is greatly improved. This example illustrates received SINR for data signals, and received SINR for pilot signal that are not orthogonal between the sectors; with regard to received SINR for pilot signals that are multiplied by orthogonal codes for each sector, the difference in received SINR between both sectors is the same, and the value of the detected received SINR increases.

The mobile station device 2c in area E has extremely small received SINR for sector #1, and extremely small received SINR for sector #2. In comparison with the mobile station device 2a in area A, the received SINR for sector #1 is greatly reduced. This is due to the small signal component from sector #1 and the large interference component from sector #2. Consequently, even when using fast sector selection with transmission muting, the small signal component sometimes makes it impossible to obtain satisfactory reception characteristics. The mobile station device 2f in area F has extremely low received SINR for sector #1, and extremely high received SINR for sector #2. That is, the received SINR depends on the distance from the base station device 1 and the distance from the sector edge.

A mobile station device 2g located in a region between two sector edges (here, between sectors #2 and #3) at a point near the base station device 1 taking the base station device 1 as its center (area G), has extremely low received SINR for sector #2 and extremely low received SINR for sector #3. When fast sector selection with transmission muting is used for sectors #1 and #2 to stop transmission from sector #2, the interference component can be suppressed not only to sector 41 but also to sector #3, whereby the received SINR changes from graph g3 to graph g4, and the received SINR of sector #3 is enhanced.

The second embodiment uses the reception power and received SINR of these sectors, and the difference in their characteristics, to select an appropriate macrodiversity method.

Figure 9:
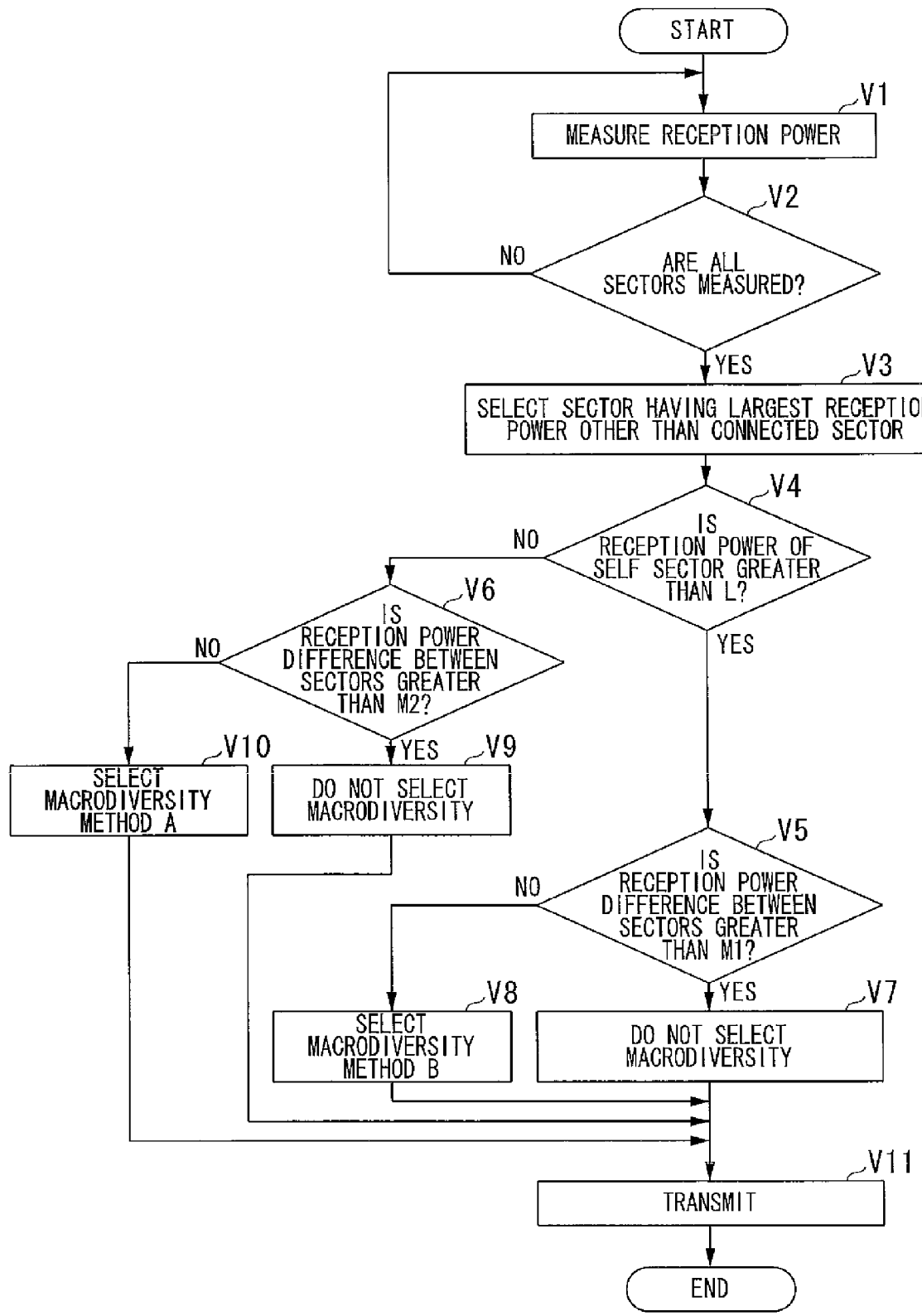
FIG. 9 is a flowchart of the flow of processes of a macrodiversity selection method according to a second embodiment of the invention.

FIG. 9 is a flowchart of a flow of processes of a macrodiversity method according to the second embodiment of the invention. Firstly, the reception power of a pilot signal is measured at the mobile station device 2 (step V1). It is then determined whether measuring has ended for all sectors (step V2). Here, 'all sectors' include sectors in the self cell and other sectors.

When measuring has not ended, the processing returns to step V1 and the reception power is measured. When measuring has ended, a sector having the largest reception power among the sectors in the self cell, other than the connected sector in the present communication, is selected as a macrodiversity candidate sector (step V3).

Then, based on the reception power fed back by the mobile station device 2, it is determined whether the reception power of the self sector is greater than a predetermined threshold L (step V4). Step V4 can determine whether the mobile station device 2 is near the base station device 1. When it is determined in step V4 that the reception power of the self sector is greater than the predetermined threshold L, it is determined that the mobile station device 2 is near to the base station device 1 and shifts to step V5. When it is determined in step V4 that the reception power of the self sector is not greater than the threshold L, it is determined that the mobile station device 2 is far from the base station device 1 and shifts to step V6. When shifting to step V5, it is determined whether the difference in the reception powers of both sectors is greater than a predetermined threshold M1. Step V5 makes it possible to determine whether the mobile station device 2 is near the sector edge.

When it is determined in step V5 that the difference is greater than the predetermined threshold M1, it is determined that the mobile station device 2 is far from the sector edge, and it is selected not to use macrodiversity (step V7). The process of step V7 is performed when, for example, the mobile station device 2 is in the region of area A in FIG. 7.

When it is determined in step V5 that the difference is not greater than the predetermined threshold M1, it is determined that the mobile station device 2 is near the sector edge, and macrodiversity method B (e.g. fast sector selection with transmission muting) is selected (step V8). The process of step V8 is performed when, for example, the mobile station device 2 is in the region of area D in FIG. 7.

When shifting to step V6, it is determined whether the difference in the reception powers of both sectors is greater than a predetermined threshold M2. Step V6 makes it possible to determine whether the mobile station device 2 is near the sector edge. When it is determined in step V6 that the difference is greater than the predetermined threshold M2, it is determined that the mobile station device 2 is far from the sector edge, and it is selected not to use macrodiversity (step V9). The process of step V9 is performed when, for example, the mobile station device 2 is in the region of area C in FIG. 7.

When it is determined in step V6 that the difference is not greater than the predetermined threshold M2, it is determined that the mobile station device 2 is near the sector edge, and macrodiversity method A (e.g. soft-combining) is selected (step V10). The process of step V10 is performed when, for example, the mobile station device 2 is in the region of area E in FIG. 7.

Step V7 or step V9 is performed when, for example, the mobile station device 2 is located in the middle region between the two sector edges of FIG. 7 termed area B, which is a middle point between the cell edge of the base station device 1 and the base station device 1, the step to be performed being determined according to the value of the threshold L of step V. When, for example, the mobile station device 2 is located in the center in the circumferential direction of sector #2 centered around the base station device 1 of FIG. 7, at a point near the base station device 1 in the diameter direction, a conventional hard handoff is performed between the processes of step V2 and step V3, and the connected sector is changed from sector #1 to sector #2.

The base station device 1 then performs transmission using the selected method (step V11).

Using the above selection process, it is possible to select an appropriate macrodiversity method from reception characteristics that fluctuate according to the position of the mobile station device 2, without additionally providing a position detector such as a GPS.

Third Embodiment

Subsequently, a macrodiversity selection method according to a third embodiment of the invention will be explained.

Since the configurations of a base station device 1 and a mobile station device 2 are the same as the base station device 1 (FIG. 5) and the mobile station device 2 (FIG. 6), they are not explained further.

Figure 10:
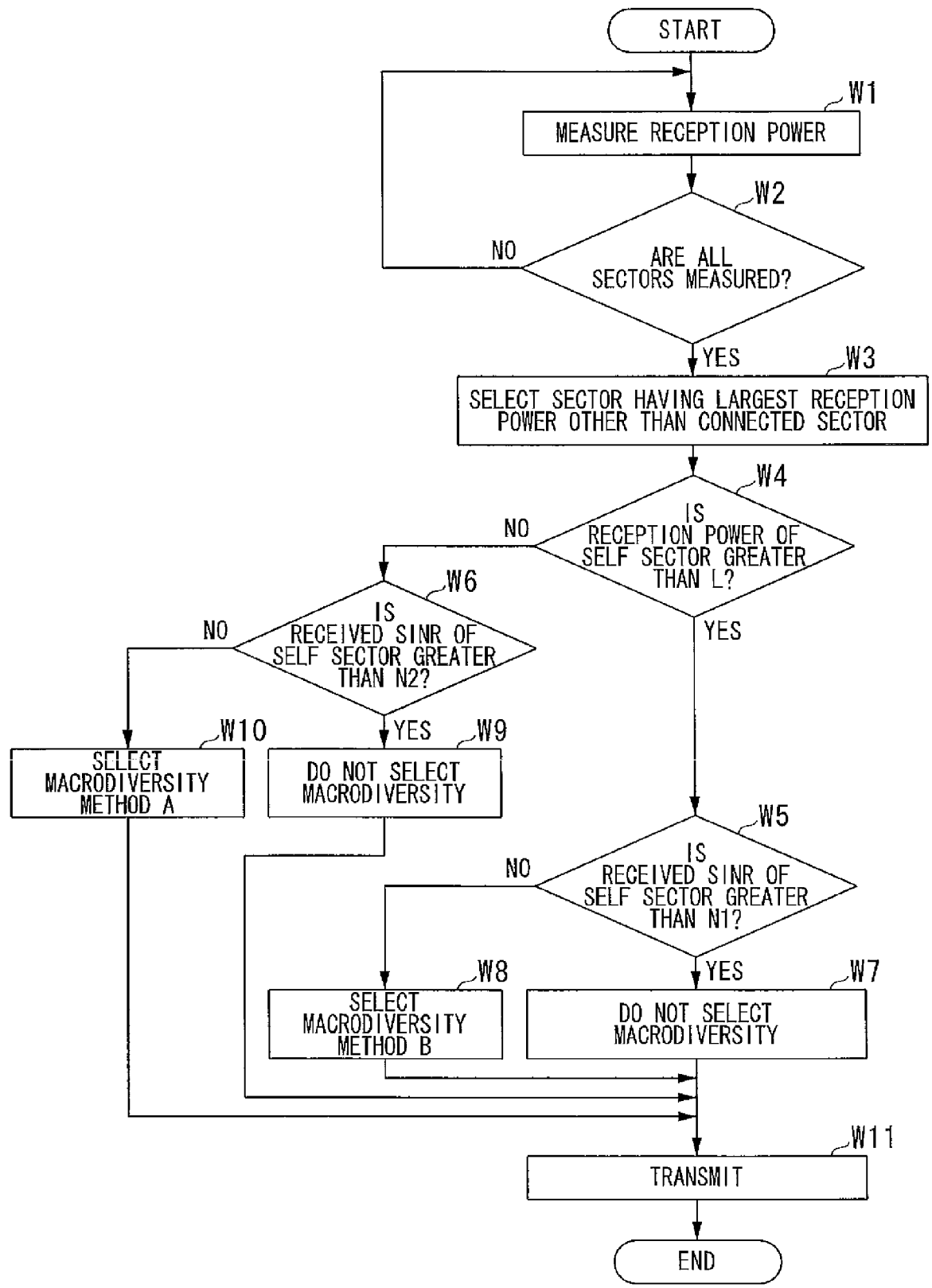
FIG. 10 is a flowchart of the flow of processes of a macrodiversity selection method according to a third embodiment of the invention.

FIG. 10 is a flowchart of the flow of processes of a macrodiversity selection method according to a third embodiment of the invention. Points of difference from the processes of the macrodiversity selection method according to the second embodiment (FIG. 9) are that, in a step W5 corresponding to step V5, it is determined whether the mobile station device 2 is near to or far from the sector edge by determining whether the received SINR of the self sector is greater than a predetermined threshold N1, and that, in a step W6 corresponding to step V6, it is determined whether the mobile station device 2 is near to or far from the sector edge by determining whether the received SINR of the self sector is greater than a predetermined threshold N2.

Processes of steps W1 to W4 and W7 to W11 are respectively the same as steps V1 to V4 and V7 to V11 of FIG. 9, and will not be explained further.

The selection process of FIG. 10 can select an appropriate macrodiversity method with more consideration for reception characteristics relating to the data error rate.

Fourth Embodiment

Subsequently, a macrodiversity selection method according to a fourth embodiment of the invention will be explained.

Since the configurations of a base station device 1 and a mobile station device 2 are the same as the base station device 1 (FIG. 5) and the mobile station device 2 (FIG. 6), they are not explained further.

Figure 11:
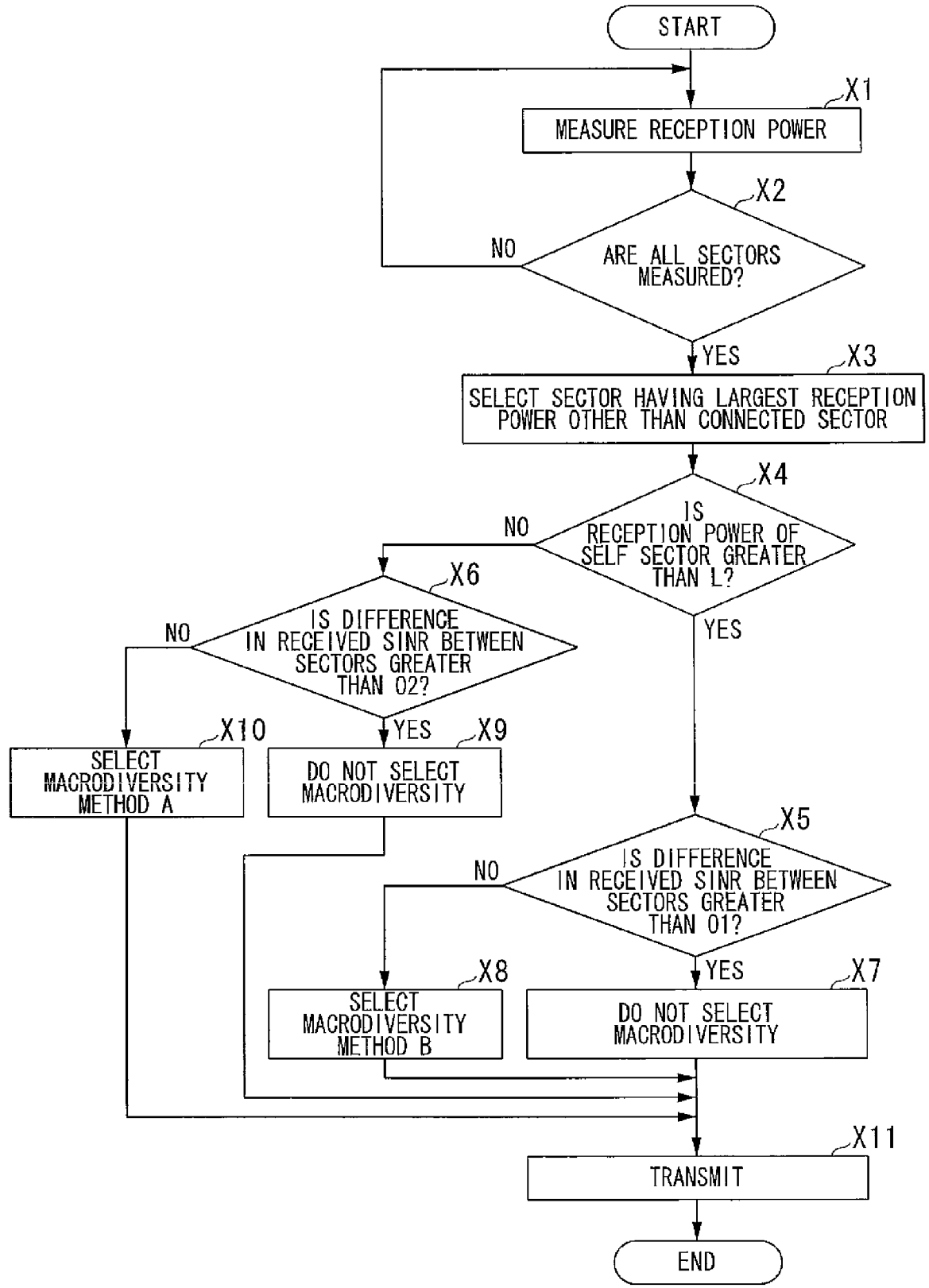
FIG. 11 is a flowchart of the flow of processes of a macrodiversity selection method according to a fourth embodiment of the invention.

FIG. 11 is a flowchart of the flow of processes of a macrodiversity selection method according to a fourth embodiment of the invention. Points of difference from the processes of the macrodiversity selection method according to the second embodiment (FIG. 9) are that, in a step X5 corresponding to step V5, it is determined whether the mobile station device 2 is near to or far from the sector edge by determining whether the difference in the received SINR of both sectors is greater than a predetermined threshold O1, and that, in a step X6 corresponding to step V6, it is determined whether the mobile station device 2 is near to or far from the sector edge by determining whether the difference in received SINR of both sectors is greater than a predetermined threshold O2.

Processes of steps X1 to X4 and X7 to X11 are respectively the same as steps V1 to V4 and V7 to V11 of FIG. 9, and will not be explained further.

This selection process can better determine whether it is desirable to employ macrodiversity, and can select an appropriate macrodiversity method.

Fifth Embodiment

Subsequently, a macrodiversity selection method according to a fifth embodiment of the invention will be explained.

Since the configurations of a base station device 1 and a mobile station device 2 are the same as the base station device 1 (FIG. 5) and the mobile station device 2 (FIG. 6), they are not explained further.

Figure 12:
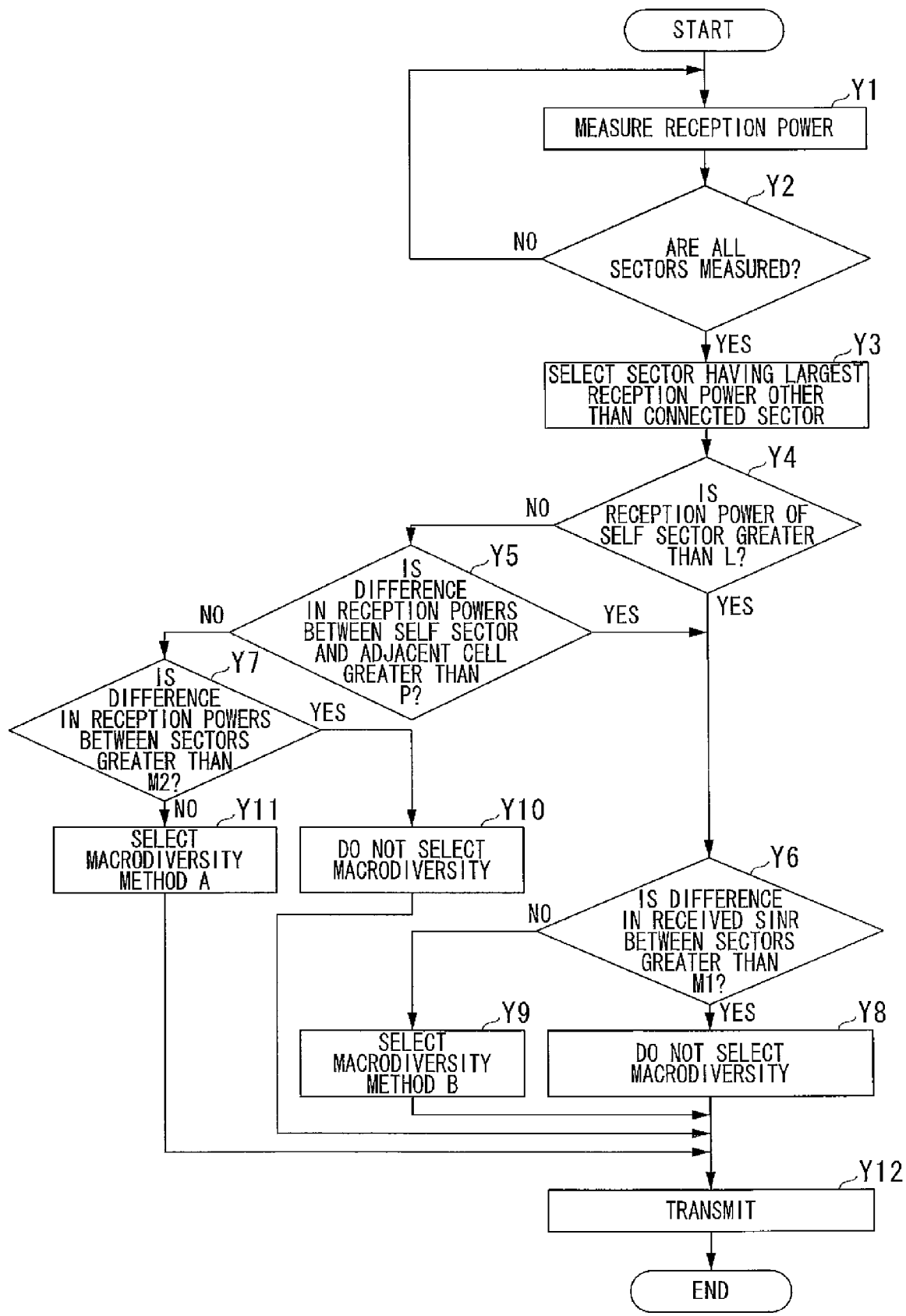
FIG. 12 is a flowchart of the flow of processes of a macrodiversity selection method according to a fifth embodiment of the invention.

FIG. 12 is a flowchart of the flow of processes of a macrodiversity selection method according to a fifth embodiment of the invention. Firstly, the reception power of a pilot signal is measured at the mobile station device 2 (step Y1). It is then determined whether measuring has ended for all sectors (step Y2). 'All sectors' includes sectors in the self cell and sectors in other cells.

When measuring has not ended, the process returns to step Y1 and the reception power is measured again. When measuring has ended, a sector having the largest reception power among the sectors in the self cell, other than the connected sector in the present communication, is selected as a macrodiversity candidate sector (step Y3). Then, based on the reception power fed back by the mobile station device 2, the base station device 1 determines whether the difference between the reception powers of the connected sector and the selected sector is greater than a predetermined threshold L (step Y4). Step Y4 can determine whether the mobile station device 2 is located near the sector edge.

When it is determined in step Y4 that the difference is greater than the predetermined threshold, the base station device 1 determines that the mobile station device 2 is far from the sector edge and selects not to use macrodiversity (step Y6). The process of step Y6 is performed when, for example, the mobile station device 2 is located in any of the regions of areas A, B, and C in FIG. 7 described later The threshold L can be the same value as the threshold L in step V4 of FIG. 9, or a different value.

When it is determined in step Y4 that the difference is greater than the threshold L, it is determined that the mobile station device 2 is near the base station device 1 and processing shifts to step Y6. When it is determined in step Y4 that the difference is not greater than the threshold L, it is determined that the mobile station device 2 is fairly far from the base station device 1, and processing shifts to step Y5. In step Y5, it is determined whether the difference between the reception powers of the self sector and the adjacent cell fed back from the mobile station device 2 is greater than a predetermined threshold P. Here, the mobile station device 2 feeds back the reception power of a sector with the highest reception power among sectors of the other cells as the reception power of adjacent cell. Step Y5 can determine whether the mobile station device 2 is located near the sector edge.

When it is determined in step Y5 that the difference is greater than the threshold P, it is determined that the mobile station device 2 is not located near the cell edge, and processing shifts to step Y6. When it is determined in step Y5 that the difference is not greater than the threshold P, it is determined that the mobile station device 2 is located near the cell edge, and processing shifts to step Y7. When shifting to step Y6, it is determined whether the difference in reception powers of both sectors is greater than a predetermined threshold M1. Step Y6 can determine whether the mobile station device 2 is located near the sector edge.

Incidentally, the threshold M1 can be the same value as the threshold M1 in step V5 of FIG. 9, or a different value.

When it is determined in step Y6 that the difference is greater than the predetermined threshold M1, it is determined that the mobile station device 2 is far from the sector edge, and it is selected not to use macrodiversity (step Y8). The process of step Y7 is performed when, for example, the mobile station device 2 is located in the region of area A in FIG. 7.

When it is determined in step Y6 that the difference is not greater than the predetermined threshold M1, it is determined that the mobile station device 2 is near the sector edge, and macrodiversity method B (e.g. fast sector selection with transmission muting) is selected (step Y9). The process of step Y9 is performed when, for example, the mobile station device 2 is located in the region of area D in FIG. 7.

When shifting to step Y7, it is determined whether the difference in the reception powers of both sectors is greater than a predetermined threshold M2. Step Y7 can determine whether the mobile station device 2 is located near the sector edge. The threshold M2 can be the same value as the threshold M2 in step V6 of FIG. 9, or a different value.

When it is determined in step Y7 that the difference is greater than the predetermined threshold M2, it is determined that the mobile station device 2 is far from the sector edge, and selection is made not to use macrodiversity (step Y10). The process of step Y10 is performed when, for example, the mobile station device 2 is located in the region of area C in FIG. 7.

When it is determined in step Y7 that the difference is not greater than the predetermined threshold M2, it is determined that the mobile station device 2 is near to the sector edge, and macrodiversity method A (e.g. soft-combining) is selected (step Y11). The process of step Y11 is performed when, for example, the mobile station device 2 is located in the region of area E in FIG. 7.

When the mobile station device 2 is located in a middle region between the two sector edges of FIG. 7 termed area B, which is a middle point between the cell edge of the base station device 1 and the base station device 1, the process of step Y8 or step Y10 is performed depending on the value of the threshold L in step Y4 or the value of the threshold P in step Y5. When the mobile station device 2 is located in area F, which is a region in the center in the circumferential direction of sector #2 centered around the base station device 1 at a point near the base station device 1 in the diameter direction, a conventional hard handoff process is performed between processes of step Y2 and step Y3, and the connected sector is changed from sector #1 to sector #2.

The base station device 1 then performs transmission using the selected method (step Y12).

The processes of FIG. 12 can estimate the location from the cell edge, and select an appropriate macrodiversity method with consideration for the accompanying interference component from other cells.

The process of FIG. 10 can also be applied in the process of FIG. 12. That is, in step Y6 corresponding to step W5, it can be determined whether the mobile station device 2 is near to or far from the sector edge by determining whether the received SINR of the self sector is greater than the predetermined threshold N1, and in step Y7 corresponding to step W6, it can be determined whether the mobile station device 2 is near to or far from the sector edge by determining whether the received SINR of the self sector is greater than the predetermined threshold N2. The thresholds N1 and N2 can be the same values as the thresholds N1 and N2 in steps W5 and W6 of FIG. 10, or different values.

The process of FIG. 11 can also be applied in the process of FIG. 12. That is, in step Y6 corresponding to step X5, it can be determined whether the mobile station device 2 is near to or far from the sector edge by determining whether the difference in the received SINR of both sectors is greater than the predetermined threshold O1, and in step Y7 corresponding to step X6, it can be determined whether the mobile station device 2 is near to or far from the sector edge by determining whether the difference in the received SINR of both sectors is greater than the predetermined threshold O2. The thresholds O1 and O2 can be the same values as the thresholds O1 and O2 in steps X5 and X6 of FIG. 11, or different values.

Sixth Embodiment

Subsequently, a macrodiversity selection method according to a sixth embodiment of the invention will be explained.

Since the configurations of a base station device 1 and a mobile station device 2 are the same as the base station device 1 (FIG. 5) and the mobile station device 2 (FIG. 6), they are not explained further.

Figure 13:
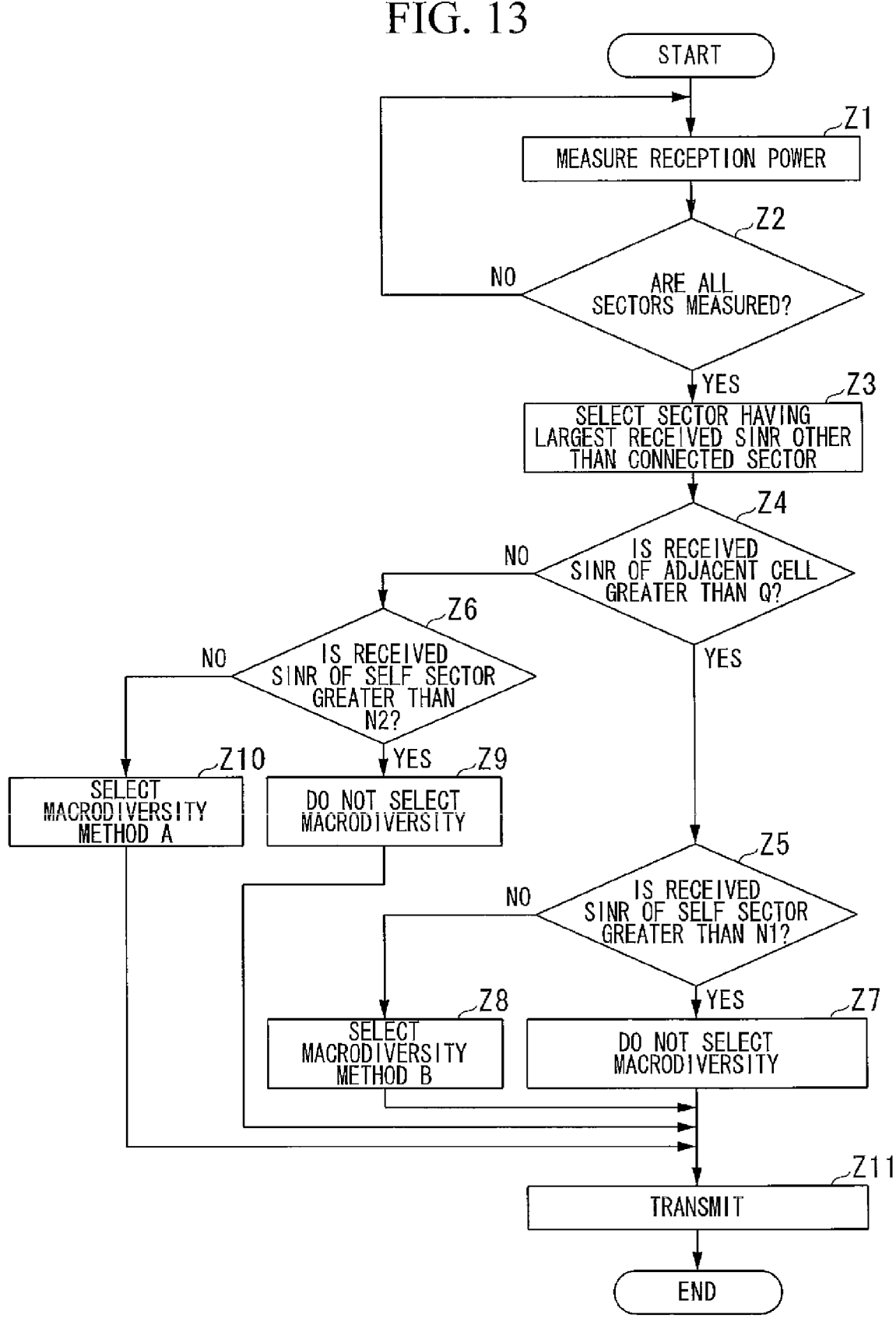
FIG. 13 is a flowchart of the flow of processes of a macrodiversity selection method according to a sixth embodiment of the invention.

FIG. 13 is a flowchart of the flow of processes of a macrodiversity selection method according to a sixth embodiment of the invention. Firstly, the reception power of a pilot signal is measured at the mobile station device 2 (step Z1). It is then determined whether measuring has ended for all sectors (step Z2). 'All sectors' includes sectors in the self cell and sectors in other cells.

When measuring has not ended, the process returns to step Z1 and the reception power is measured again. When measuring has ended, a sector having the largest reception power among the sectors in the self cell, other than the connected sector in the present communication, is selected as a macrodiversity candidate sector (step Z3). Then, based on the reception power fed back by the mobile station device 2, the base station device 1 determines whether the received SINR of the adjacent sector of the adjacent cell fed back by the mobile station device 2 is smaller than a predetermined threshold Q (step Z4). Step Z4 can determine whether the mobile station device 2 is located near the sector edge.

When it is determined in step Z4 that the received SINR is not smaller than the predetermined threshold Q, the base station device 1 determines that the mobile station device 2 is near the cell edge and shifts to step Z6. When shifting to step Z5, it is determined whether the received SINR of the self sector is greater than the predetermined threshold N1. Step Z5 can determine whether the mobile station device 2 is located near the sector edge. The threshold N1 can be the same value as the threshold N1 in step V5 of FIG. 10, or a different value.

When it is determined in step Y6 that the difference is greater than the predetermined threshold M1, it is determined that the mobile station device 2 is far from the sector edge, and it is selected not to use macrodiversity (step Y8). The process of step Y7 is performed when, for example, the mobile station device 2 is located in the region of area A in FIG. 7.

When it is determined in step Z5 that the received SINR is not greater than the predetermined threshold N1, it is determined that the mobile station device 2 is near to the sector edge, and macrodiversity method B (e.g. fast sector selection with transmission muting) is selected (step Z8). The process of step Z8 is performed when, for example, the mobile station device 2 is in the region of area D in FIG. 7.

When shifting to step Z6, it is determined whether the received SINR of the self sector is greater than a predetermined threshold N2. Step Z6 can determine whether the mobile station device 2 is located near the sector edge. The threshold N2 can be the same value as the threshold N1 in step W6 of FIG. 10, or a different value.

When it is determined in step Z6 that the received SINR is greater than the predetermined threshold N2, the base station device 1 determines that the mobile station device 2 is far from the sector edge, and selects not to use macrodiversity (step Z9). The process of step Z9 is performed when, for example, the mobile station device 2 is in the region of area C in FIG. 7.

When it is determined in step Z6 that the difference is not greater than the predetermined threshold N2, it is determined that the mobile station device 2 is near to the sector edge, and macrodiversity method A (e.g. soft-combining) is selected (step Z10). The process of step Z10 is performed when, for example, the mobile station device 2 is in the region of area E in FIG. 7.

When the mobile station device 2 is located in a middle region between the two sector edges of FIG. 7 termed area B, which is a middle point between the cell edge of the base station device 1 and the base station device 1, the process of step Z7 or step Z9 is performed depending on the value of the threshold Q in step Z4. When the mobile station device 2 is located in area F, which is a region in the center in the circumferential direction of sector #2 centered around the base station device 1 at a point near the base station device 1 in the diameter direction, a conventional hard handoff process is performed between processes of step Z2 and step Z3, and the connected sector is changed from sector #1 to sector #2.

The base station device 1 then performs transmission to the mobile station device 2 using the selected method (step Z11).

These processes can estimate the location from the cell edge, reduce the amount of feedback information by narrowing it to the received SINR, and select an appropriate macrodiversity method, while considering the accompanying interference component from other cells.

The process of FIG. 11 can also be applied in the process of FIG. 13. That is, in step Z5 corresponding to step X5, it can be determined whether the mobile station device 2 is near to or far from the sector edge by determining whether the difference in received SINR between both sectors is greater than the predetermined threshold O1, and in step Z6 corresponding to step X6, it can be determined whether the mobile station device 2 is near to or far from the sector edge by determining whether the difference in received SINR between both sectors is greater than the predetermined threshold O2. The thresholds O1 and O2 can be the same values as the thresholds O1 and O2 in steps X5 and X6 of FIG. 11, or different values.

In step Z4 of FIG. 13, instead of determining whether the received SINR of the adjacent cell is smaller than the predetermined threshold Q, it can be determined whether the difference in received SINR between the self sector and the adjacent cell is greater than a predetermined threshold.

As the macrodiversity method A in the first to sixth embodiments, in addition to soft-combining, it is also possible to use space time transmit diversity and closed loop macrodiversity which were already mentioned above. As the macrodiversity method B, instead of fast sector selection with transmission muting, it is possible to use a method that sets the transmission power to a value smaller than the other sector, and thereby relieves the interference component to the other sector.

In the first to sixth embodiments, instead of measuring the reception powers of all the sectors, the mobile station device can measure sectors arbitrarily determined by the base station device.

Seventh Embodiment

Figure 14:
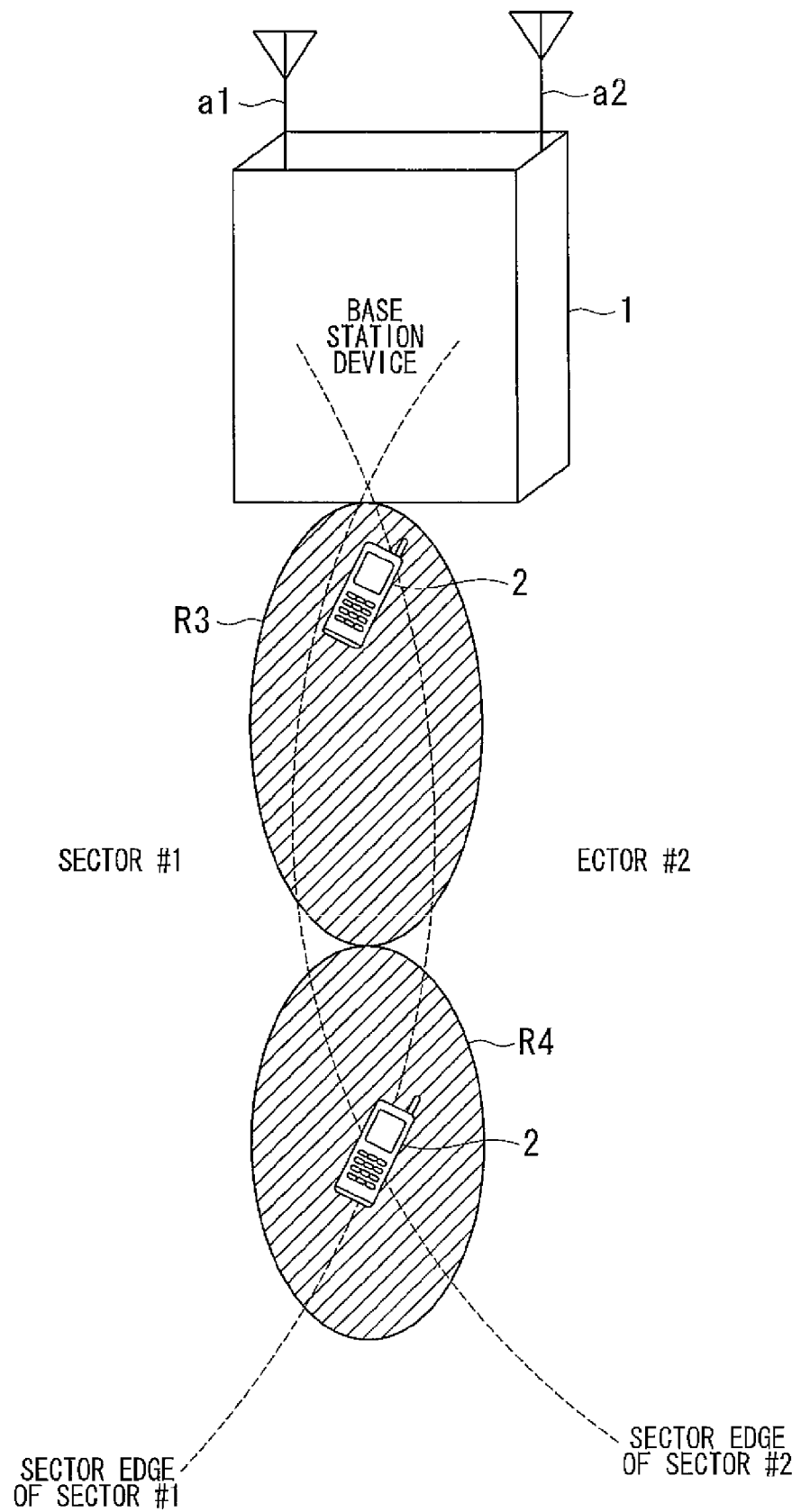
FIG. 14 is a conceptual diagram of a macrodiversity selection method according to a seventh embodiment of the invention.

FIG. 14 is a conceptual diagram of a macrodiversity selection method according to a seventh embodiment of the invention. While macrodiversity method B (e.g. fast sector selection with transmission muting) is used in area R3 (sector edge near the cell center) near the base station device 1 as in the other embodiments, a point of difference from the other embodiments is that one of soft-combining using channel phase characteristics and macrodiversity method B (e.g. fast sector selection with transmission muting) is used in area R (sector edge near the cell edge) near the cell edge.

Figure 15:
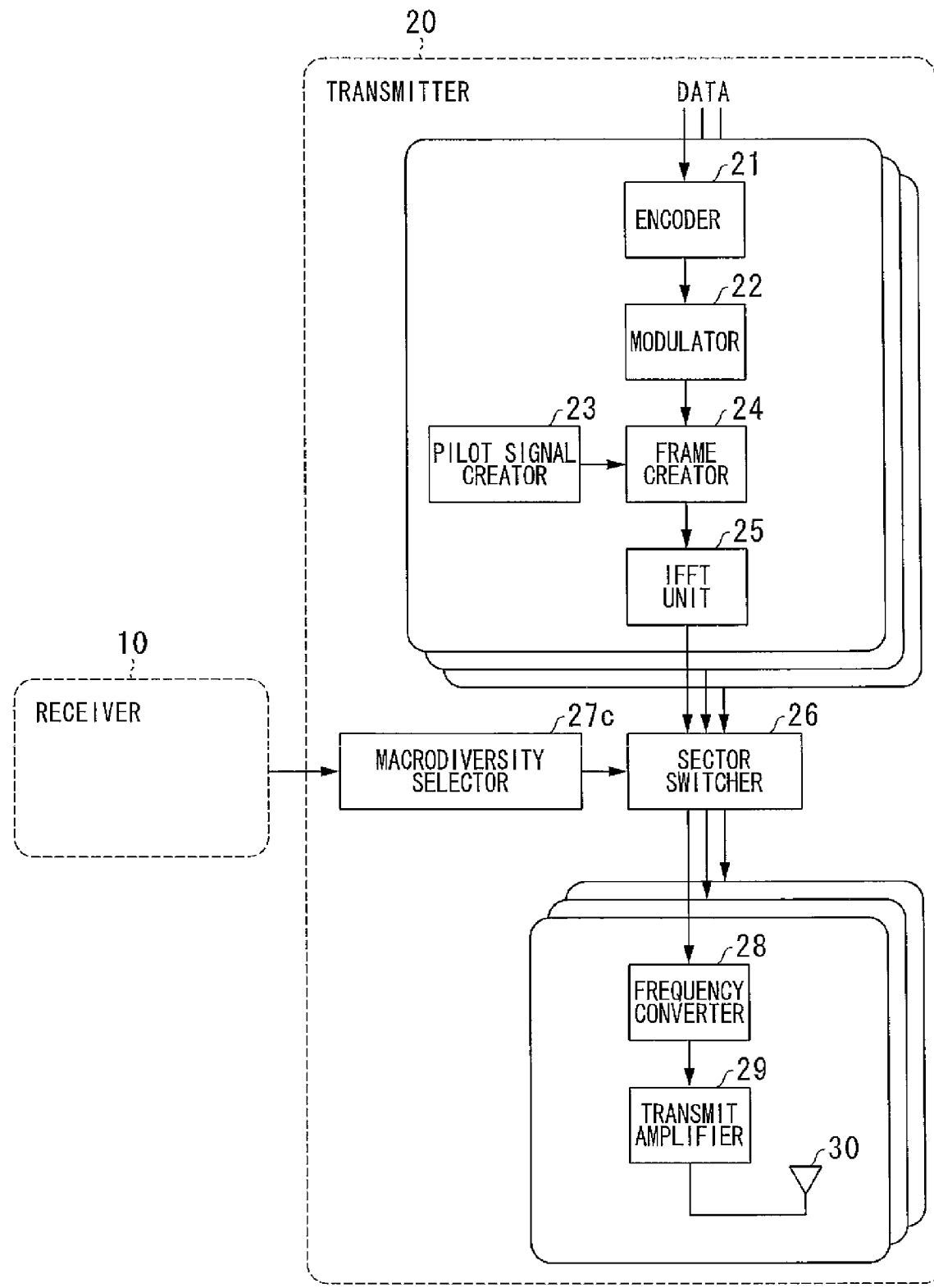
FIG. 15 is a diagram of the configuration of a base station device according to an eighth embodiment of the invention.

FIG. 15 is a block diagram of the configuration of a base station device according to a seventh embodiment of the invention. Like parts to those of the configuration of the base station device according to the first embodiment (FIG. 2) are denoted by like reference numerals and are not repetitiously explained.

In this embodiment, the signal that is input to a macrodiversity selector 27c, and the processing content of the macrodiversity selector 27c, differ from those in the base station device 1 according to the first embodiment.

Channel phase information is fed back to the base station device 1 from the mobile station device 2, and input to a macrodiversity selector 27c. Based on this information, the macrodiversity selector 27c determines whether to use macrodiversity between the sectors, selects a macrodiversity method to be used, and outputs sector selection control information. A specific selection method will be explained later with reference to FIG. 17.

Figure 16:
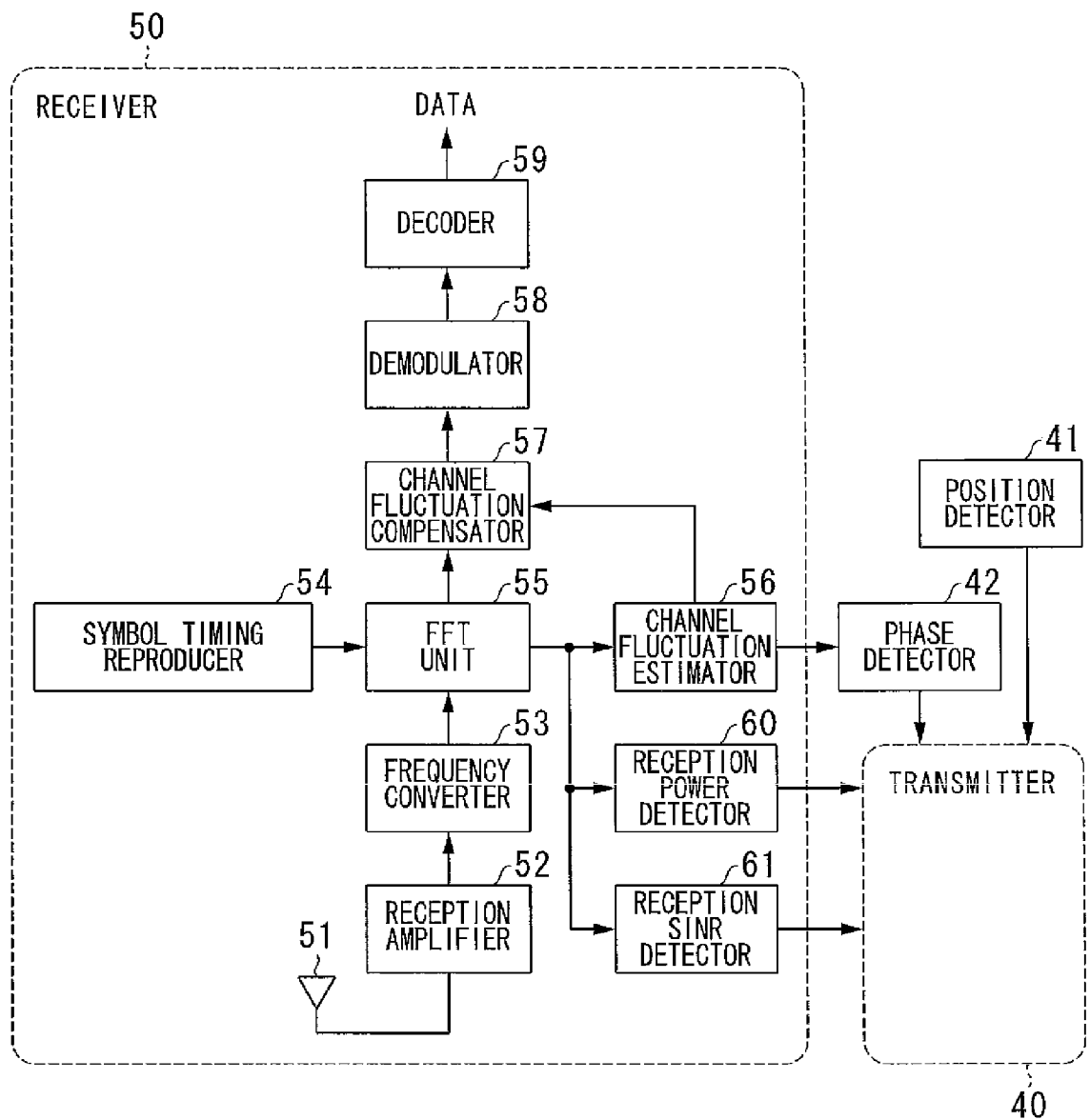
FIG. 16 is a diagram of the configuration of a mobile station device to a seventh embodiment of the invention.

FIG. 16 is a block diagram of the configuration of a mobile station device according to a seventh embodiment of the invention.

Like parts to those of the configuration of the mobile station device 2 according to the first embodiment (FIG. 3) are denoted by like reference numerals and are not repetitiously explained.

This embodiment differs from the mobile station device 2 according to the first embodiment in that it includes a channel phase extractor 42 that extracts a phase of a channel, and that it feeds backs an extracted channel phase to the base station device 1.

Figure 17:
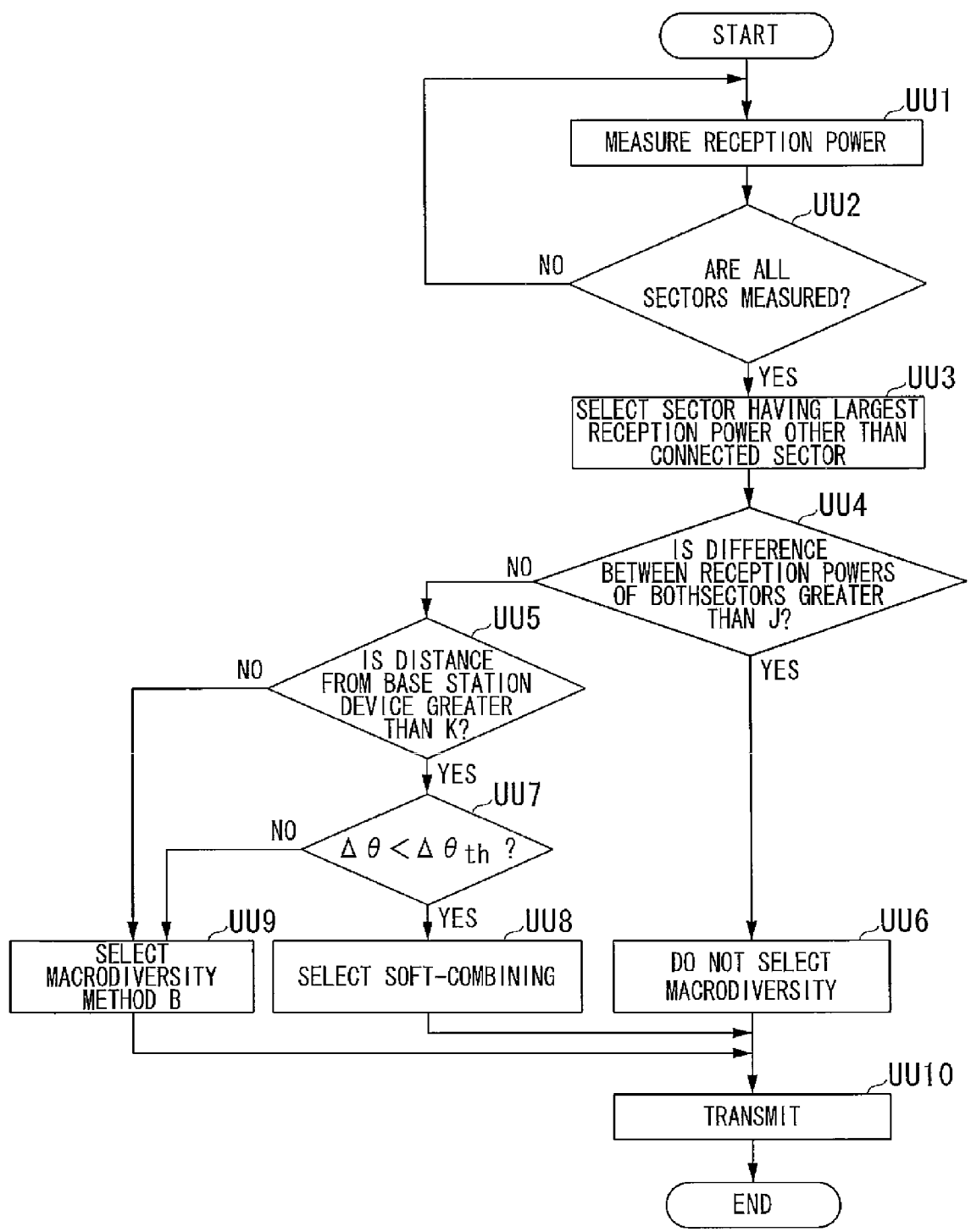
FIG. 17 is a flowchart of the flow of processes of a macrodiversity selection method according to a seventh embodiment of the invention.

FIG. 17 is a flowchart of the flow or processes of a macrodiversity selection method according to the seventh embodiment of the invention. Processes of steps UU1 to UU4 in FIG. 17 are respectively the same as steps U1 to U4 of FIG. 4, and will not be explained further.

In FIG. 17, when it is determined in step UU5 that the distance between the mobile station device 2 and the base station device 1 is greater than a predetermined threshold K, it is further determined in step UU7 whether the channel phase difference between the self sector and another sector ($\Delta\theta = \theta_1 - \theta_2$) is smaller than a predetermined threshold $\Delta\theta_{th}$ (e.g. $\Delta\theta_{th} = 90$ degrees).

When it is determined in step UU7 that the channel phase difference is smaller than the predetermined threshold $\Delta\theta_{th}$, soft-combining is selected (step UU8). The process of step UU8 is performed when, for example, the mobile station device 2 is located in the region of area E in FIG. 7.

When it is determined in step UU7 that the channel phase difference is not smaller than the predetermined threshold $\Delta\theta_{th}$, macrodiversity method B (e.g. fast sector selection with transmission muting) is selected (step UU9). The reason for this is that, if soft-combining is selected when there is a large channel phase difference, signals from each sector will cancel each other out and it will be impossible to achieve macrodiversity. The process of step UU9 is performed when, for example, the mobile station device 2 is located in the region of area D in FIG. 7.

The base station device 1 then performs transmission using the selected method (step UU10).

By selecting the macrodiversity method in accordance with channel phase information and positional information of the mobile station device 2 as described above, the reception characteristics of the mobile station device 2 can be increased while considering interference to other cells and sectors, and appropriate macrodiversity transmission can be performed.

While this embodiment describes an example where, as in the first embodiment, positional information of the mobile station device 2 is used in selecting macrodiversity, it is also possible to use reception power and received SINR in selecting macrodiversity, as in the first to sixth embodiments.

That is, in FIG. 5, channel phase information of the mobile station device 2 is fed back to the base station device 1, and the macrodiversity selector 27b uses this phase information to determine whether to use macrodiversity between the sectors, selects a macrodiversity method to be used, and outputs sector selection control information.

In FIG. 6, the mobile station device 2 further includes a channel phase extractor, and feeds back extracted phase information relating to the channel of each sector to the base station device 1.

Figure 18:
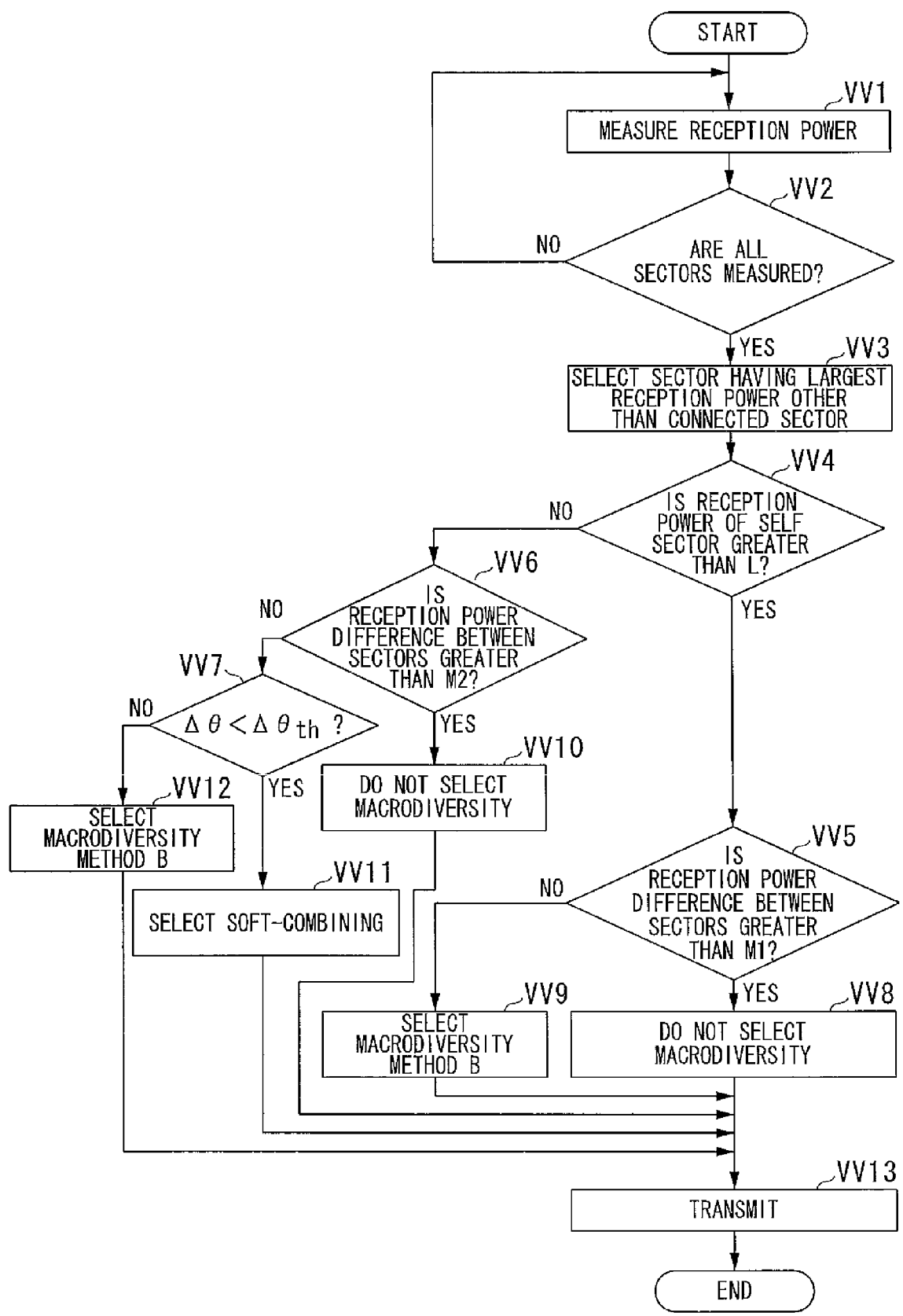
FIG. 18 is a flowchart of the processes of a macrodiversity selection method when channel phase information is used in the processes of the second embodiment shown in FIG. 9.

An example of a process where channel phase information is used in the process of the second embodiment (FIG. 9) will be explained. FIG. 18 is a flowchart of the flow of processing of a macrodiversity selection method when channel phase information is used in the process of the second embodiment (FIG. 9). Processes of steps VV1 to VV6, VV8 to VV10, and VV13 in FIG. 18 correspond to steps V1 to V6, VV7 to VV9, and VV1 of FIG. 9, and will not be repetitiously explained.

When it is determined in step VV6 that the difference in reception powers between the self sector and another sector is not greater than a predetermined threshold M2, it is further determined in step JJ7 whether the phase difference between channels of the self sector and the other sector ($\Delta\theta=|\theta_1-\theta_2|$) is smaller than a predetermined threshold $\Delta\theta_{th}$ (e.g. $\Delta\theta=90$ degrees). When it is determined in step VV7 that the channel phase difference is smaller than the predetermined threshold $\Delta\theta_{th}$, soft-combining is selected (step VV11). When it is determined in step VV7 that the channel phase difference is not smaller than the predetermined threshold $\Delta\theta_{th}$, macrodiversity method B (e.g. fast sector selection with transmission muting) is selected (step VV12). The processes of steps V11 and V12 are performed when, for example, the mobile station device 2 is located in the region of area E in FIG. 7.

Processes such as those of steps VV7, VV11, and VV12 can also be performed in the third to sixth embodiments.

In FIG. 17, instead of performing the process of step UU5, the flow can be such that, when it is determined in step UU4 that the difference in reception powers of the sectors is not greater than the predetermined threshold J, processing shifts to step UU7 where, based on the channel phase information, one of macrodiversity method B (e.g. fast sector selection with transmission muting) and soft-combining is selected. This process is conceivably used in a state such as that of FIG. 19.

Figure 19:
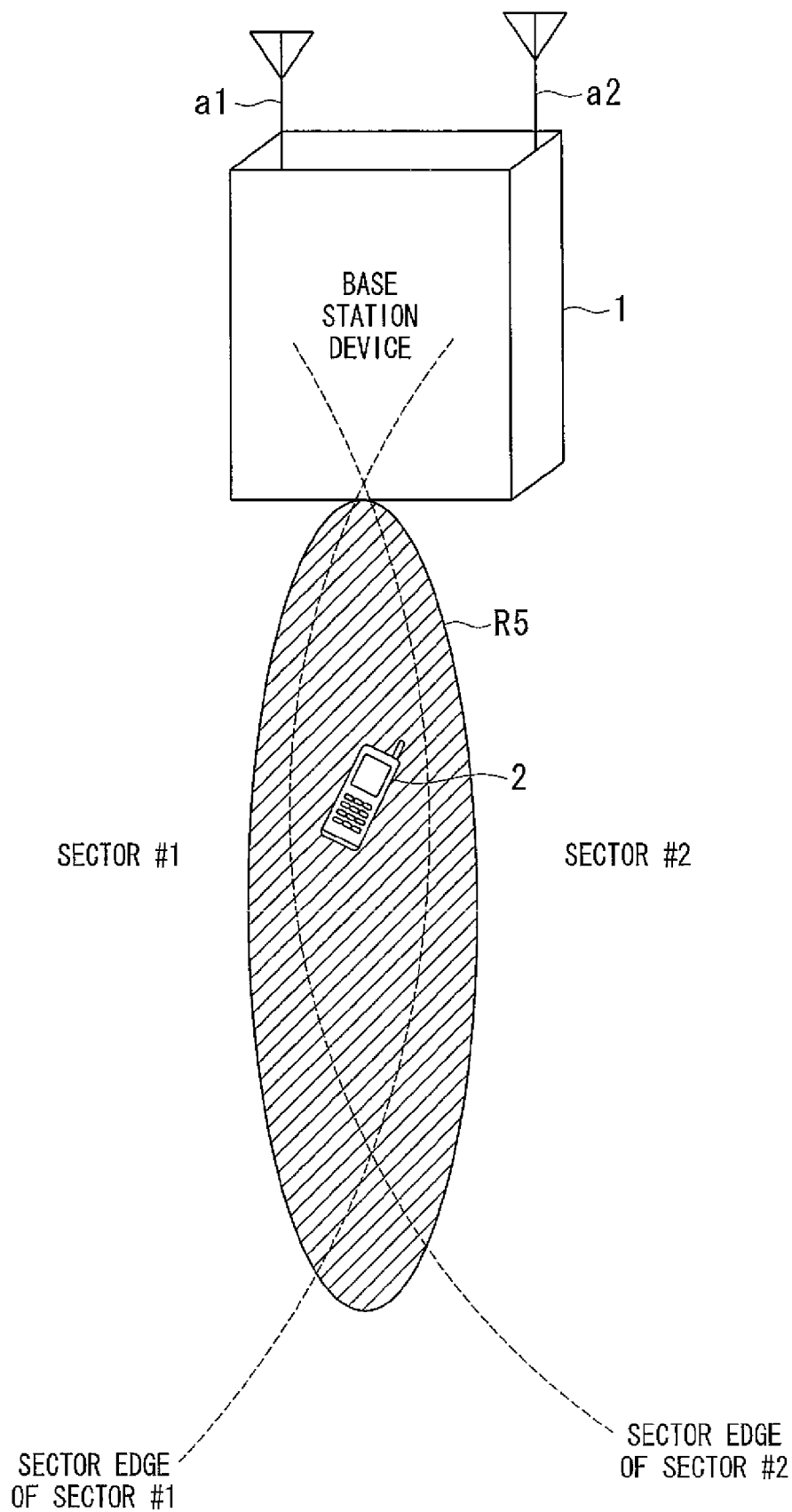
FIG. 19 is a conceptual diagram of one example of a macrodiversity selection method according to a modification of the seventh embodiment of the invention.
Figure 20A:
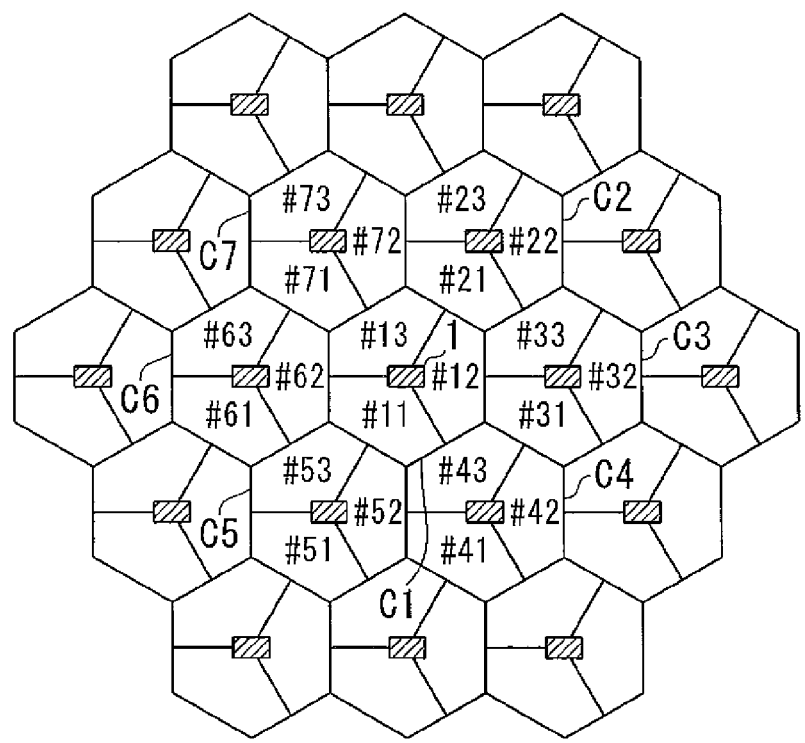
FIG. 20A is a plan view of one example of cell and sector configurations.
Figure 20B:
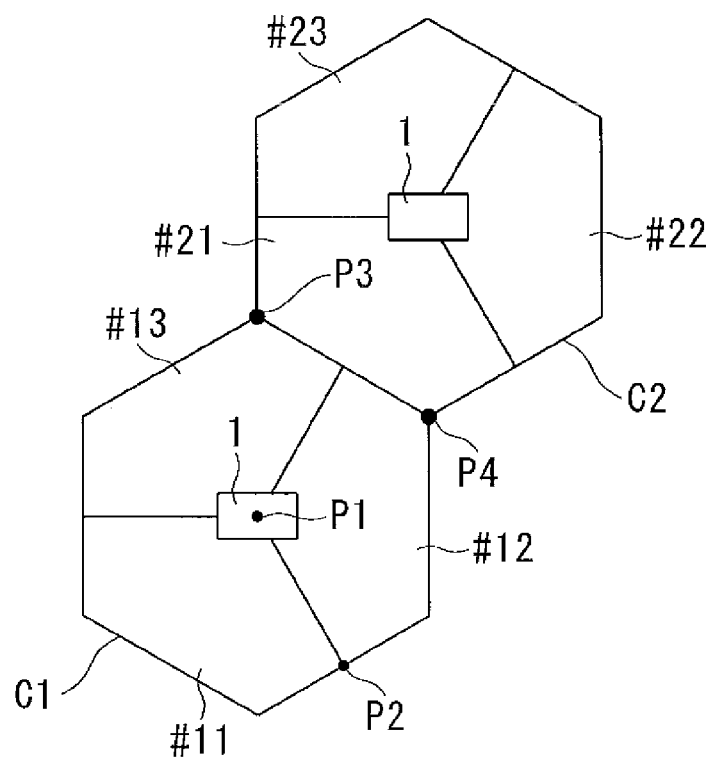
FIG. 20B is an enlarged plan view of part of the cell and sector configurations shown in FIG. 20A.
Figure 21:
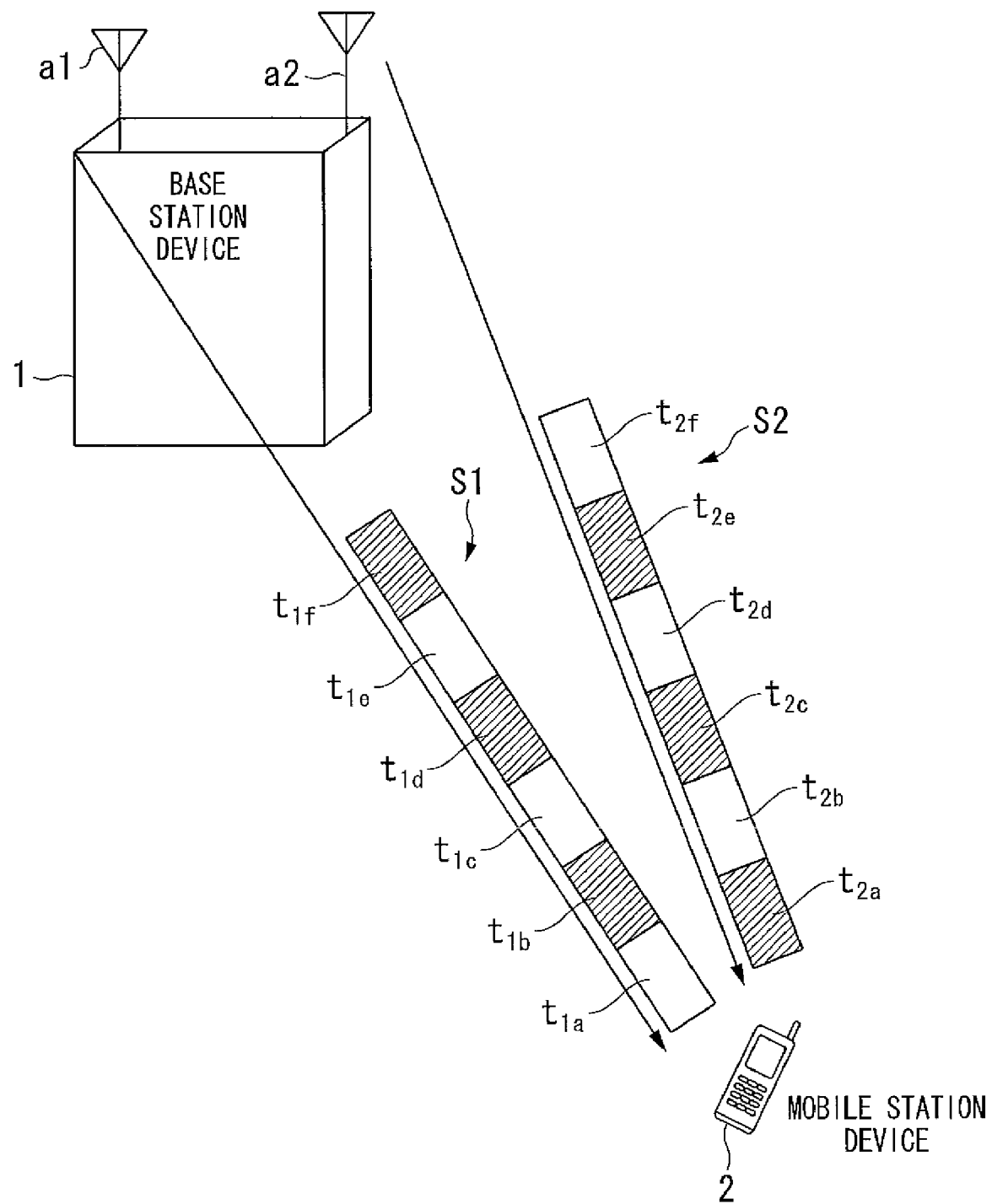
FIG. 21 is one example of a macrodiversity method of transmitting from a plurality of sectors using a signal created from information that differs between sectors.
Figure 22:
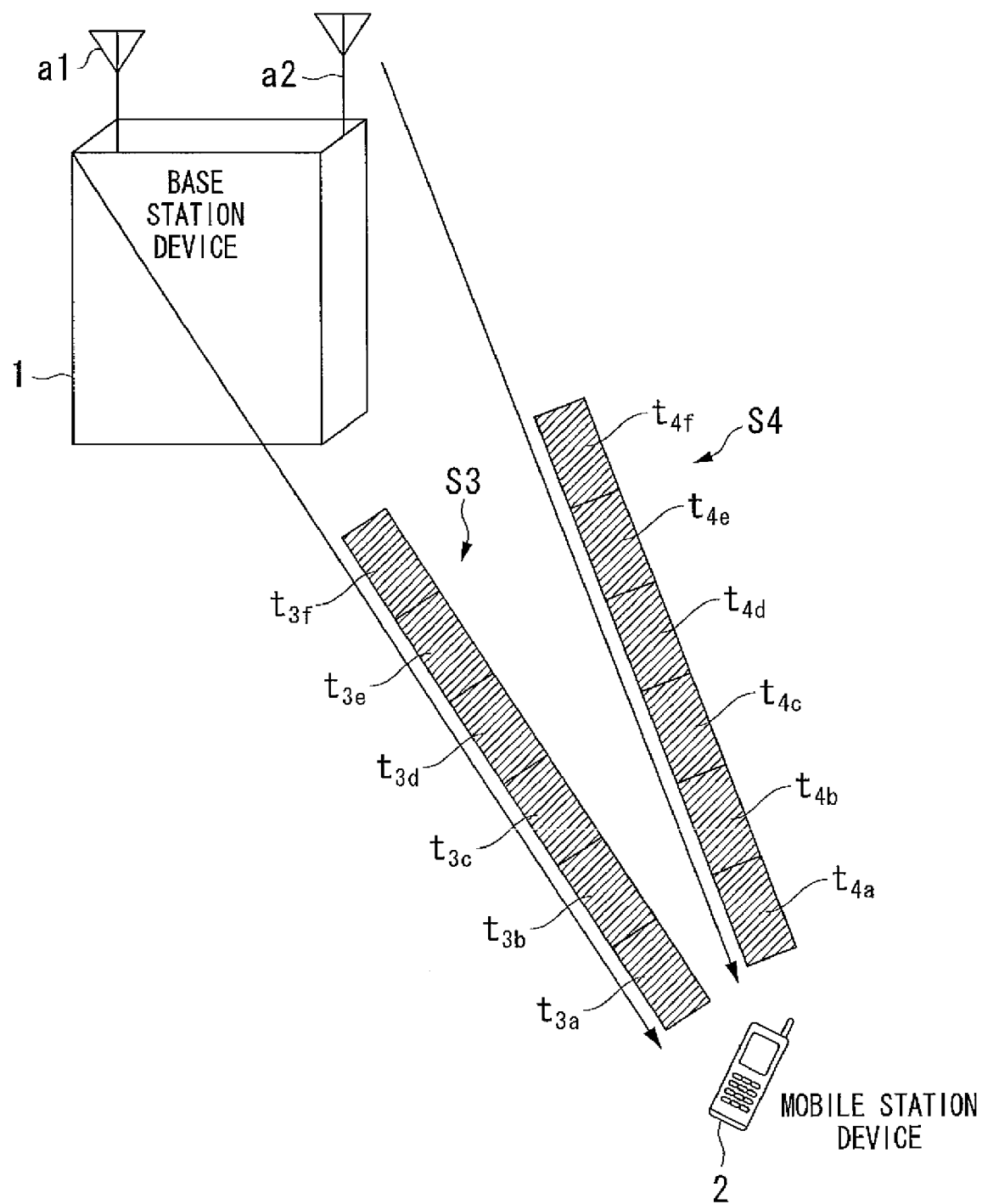
FIG. 22 is another example of a macrodiversity method of transmitting from a plurality of sectors using a signal created from information that is identical between sectors.
Figure 23:
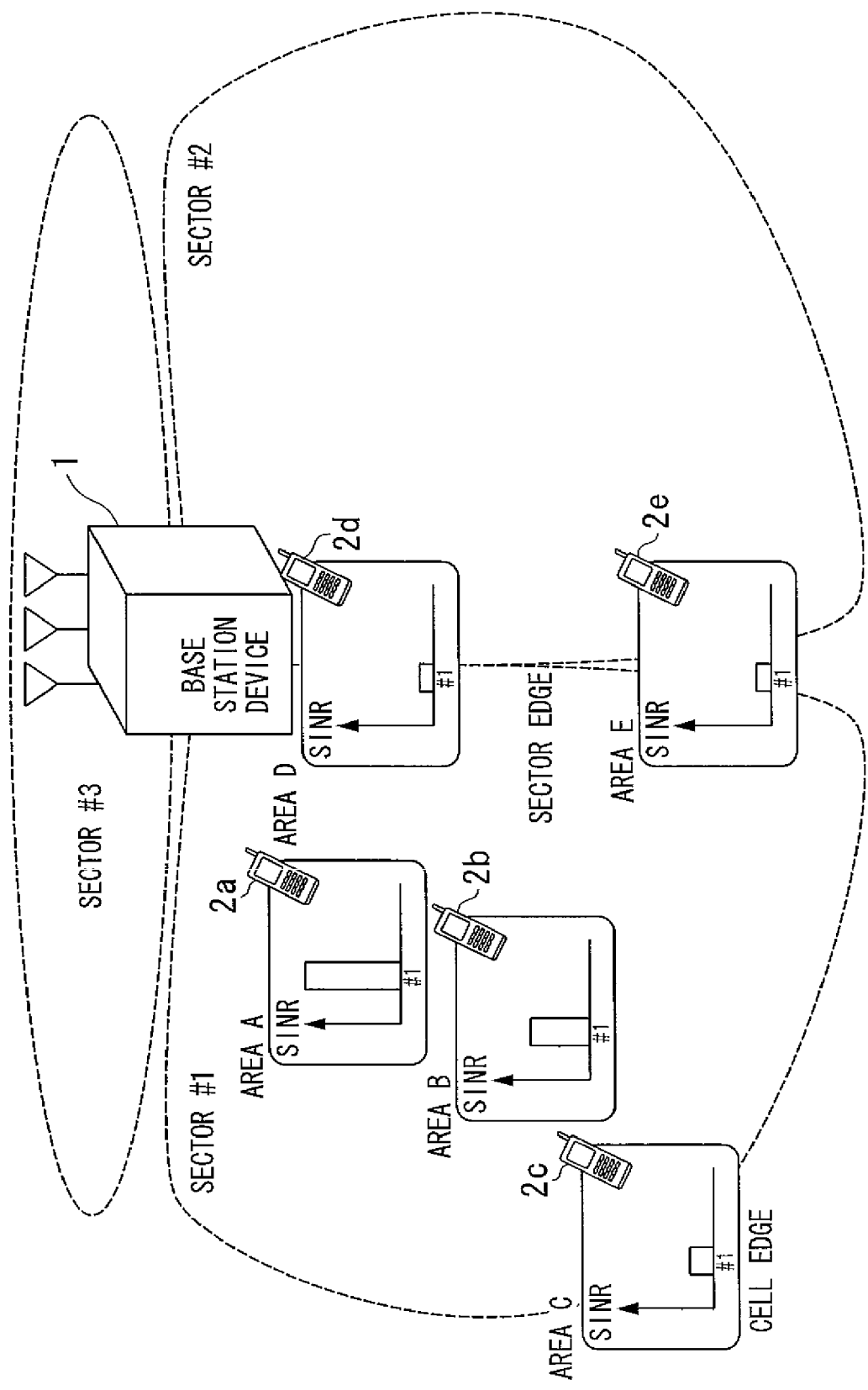
FIG. 23 is a diagram of fluctuation in received SINR of a mobile station device in sectors.

FIG. 19 is a conceptual diagram of one example of a macrodiversity selection method according to a modification of the seventh embodiment of the invention. In this embodiment, the distance between the mobile station device 2 and the base station device 1 is not considered; instead, when it is determined that the mobile station device 2 is located in area R5 (sector edge near cell center, and sector edge near cell edge), a macrodiversity method that obtains the best reception characteristics for the mobile station device 2 that is the target of macrodiversity is selected.

As the macrodiversity method B, instead of fast sector selection with transmission muting, it is possible to use a method that sets the transmission power to a value smaller than in the other sector, and thereby relieves the interference component to the other sector.

In the first to seventh embodiments, it is assumed that the reception powers and the received SINR are compared between the sectors, and, when the value of the other sector exceeds a preset threshold more than the self sector, the connected sector is switched and a hard handoff between sectors is performed at the time of selecting macrodiversity.

In the first to seventh embodiments, the method of detecting reception power is not limited to detection from a pilot signal. For example, the configuration can be one where the base station device 1 transmits a signal that is different from the pilot signal for channel estimation and the like, and the mobile station device 2 uses this to detect the reception power. Also in the first to seventh embodiments, the method of narrowing down candidate sectors is not limited to determination based on reception power, and can be determined based on reception power instead. While this embodiment describes an example where macrodiversity uses two sectors #1 and #2, macrodiversity can be performed using three or more sectors.

As described above according to the macrodiversity selection method of the first to seventh embodiments, when the mobile station device 2 is located near the sector edge, a selection is made between using macrodiversity method A (e.g. soft-combining) and using macrodiversity method B (e.g. fast sector selection with transmission muting) based on whether the distance between the base station device 1 and the mobile station device 2 is greater than a predetermined threshold, or whether the reception powers or the received SINR of the sectors are greater or smaller than a predetermined threshold, or whether the channel phase difference between the sectors is smaller than a predetermined threshold.

Therefore, at a sector edge near the cell center where the reception powers from two sectors are high and deterioration of reception characteristics due to interference between the sectors is dominant, when using macrodiversity method A to transmit a signal from one sector to the mobile station device 2, transmission of a signal from the other sector to the mobile station device 2 is stopped, or the transmission power is reduced in transmitting a signal from the other sector to the mobile station device 2, thereby preventing interference between signals transmitted from two sectors to one mobile station device 2, or, by reduction, maintaining requested quality while reducing the interference to an adjacent sector and an adjacent cell other than the macrodiversity target.

Also, at a sector edge near a cell edge where reception powers from two sectors are high and reception characteristics deteriorate due to interference between the sectors, reduction in signal power, and interference between cells, when using macrodiversity method B to transmit a signal created from identical information from two sectors to the mobile station device 2, interference between signals transmitted from two sectors to one mobile station device 2 can be prevented; in addition, by synthesizing the signals transmitted from two sectors, reception power is increased and requested quality can be maintained. At a sector edge near a cell edge, when effects of soft-combining as macrodiversity method B cannot be sufficiently obtained, the reception characteristics of the mobile station device 2 can be enhanced by using macrodiversity method A.

Consequently, cell throughput of the base station device 1 that transmits signals from a plurality of sectors to the mobile station device 2 can be increased, and so can improve system throughput of a system including a plurality of cells.

While in the first to seventh embodiments, the macrodiversity selectors 27a to 27c of the base station device 1 select one of macrodiversity methods A and B based on information relating to reception power and received SINR reported from the mobile station device 2, the configuration is not limited to this. Instead, one of macrodiversity methods A and B can be selected based on information relating to reception power and received SINR, and the selection result can then be reported to the base station device 1.

In the embodiments described above, a program for realizing functions of the receiver 10, the transmitter 20, the encoder 21, the modulator 22, the pilot signal creator 23, the frame creator 24, the IFFT unit 25, the sector switcher 26, the macrodiversity selectors 27a to 27c, the frequency converter 28, the transmit amplifier 29 of FIGS. 2, 5, and 15, or a program for realizing functions of the transmitter 40, the position detector 41, the channel phase extractor 42, the receiver 50, the reception antenna 51, the reception amplifier 52, the frequency converter 53, the symbol timing reproducer 54, the FFT unit 55, the channel fluctuation estimator 56, the channel fluctuation compensator 57, the demodulator 58, the decoder 59, the reception power detector 60, the reception power difference detector 70, and the reception SINR difference detector 71 of FIGS. 3, 6, and 16 can be stored on a computer-readable recording medium; the base station device 1 and the mobile station device 2 can then be controlled by making a computer system read and execute the programs stored in the recording medium.

Here, 'computer system' includes hardware such as OS and peripheral devices.

'Computer-readable recording medium' denotes a portable medium such as a flexible disk, an optical magnetic disk, a ROM, a CD-ROM, and a storage apparatus such as a hard disk incorporated in the computer system. Moreover, 'computer-readable recording medium' includes one that actively stores a program for a short time, such as a communication line used when transmitting a program via a network such as the internet and a communication connection such as a telephone line, and one that stores a program for a fixed time, such as a volatile memory in computer systems that form the server and client in that case. The program can be used in realizing some of the functions mentioned above, or it can be used in realizing those functions in combination with programs that are already stored in the computer system.

While preferred embodiments of the invention have been described and illustrated above, its specific configuration is not limited to these embodiments, and includes design modifications, expansion to a general multicarrier system, and so on.

INDUSTRIAL APPLICABILITY

The invention can be applied in a base station device that uses a plurality of sectors to perform macrodiversity transmission to a mobile station device, a mobile station device that transmits information relating to selection of a macrodiversity method to a base station device, a macrodiversity selection method relating to selection of a macrodiversity method, and a wireless communication system that performs macrodiversity transmission, and can enhance cell throughput of a cell having a plurality of sectors, and system throughput of a system having a plurality of cells.

The invention claimed is:

1. A base station device comprising a macrodiversity function between a plurality of sectors that selects, in accordance with a predetermined determination reference based on reception conditions of a mobile station device, a macrodiversity method to be used with respect to the mobile station device from among a plurality of macrodiversity methods, wherein the base station device selects one of a first macrodiversity method of transmitting a signal created from identical information in a plurality of sectors from the sectors, and a second macrodiversity method of transmitting signal created from different information in a plurality of sectors from the sectors so as to suppress interference to an arbitrary sector, in accordance with the predetermined determination reference based on reception conditions of the mobile station device.

2. The base station device according to claim 1, which detects the location of the mobile station device and, when the mobile station device is located at a sector edge near the center of a cell, selects the second macrodiversity method, and, when the mobile station device is located at a sector edge near a cell edge, selects the first macrodiversity method.

3. The base station device according to claim 1, which selects whether to use macrodiversity based the reception power of a self sector, being a sector connected at the mobile station device, and the difference between the reception powers of the self sector and another sector, being a sector which is not connected at the mobile station device, and selects a macrodiversity method to be used.

4. The base station device according to claim 1, which selects whether to use macrodiversity based on the reception power of a self sector, being a sector connected at the mobile station device, and a received signal to interference plus noise ratio of the self sector, and selects a macrodiversity method to be used.

5. The base station device according to claim 1, which selects whether to use macrodiversity based on the reception power of a self sector, being a sector connected at the mobile station device, and the difference between the received signal to interference plus noise ratios of the self sector and another sector, being a sector which is not connected at the mobile station device, and selects a macrodiversity method to be used.

6. The base station device according to claim 3, which further selects whether to use macrodiversity based on the difference in reception powers between the self sector and an adjacent cell, and selects a macrodiversity method to be used.

7. The base station device according to claim 3, which further selects whether to use macrodiversity based on the reception power of an adjacent cell, and selects a macrodiversity method to be used.

8. The base station device according to claim 1, which selects whether to use macrodiversity based on the received signal to interference plus noise ratio of an adjacent cell at the mobile station device, and the received signal to interference plus noise ratio of a self sector, being a sector connected at the mobile station device, and selects a macrodiversity method to be used.

9. The base station device according to claim 1, which selects whether to use macrodiversity based on the received signal to interference plus noise ratio of an adjacent cell at the mobile station device, and the difference between the received signal to interference plus noise ratios of a self sector, being a sector connected at the mobile station device, and another sector, being a sector which is not connected at the mobile station device, and selects a macrodiversity method to be used.

10. The base station device according to claim 1, which uses soft-combining, being a method of transmitting signals that are identical among the sectors, as the first macrodiversity method.

11. The base station device according to claim 1, which uses space time transmit diversity, being a method of transmitting signals that are encoded by space-time encoding between the sectors, as the first macrodiversity method.

12. The base station device according to claim 1, which uses, as the first macrodiversity method, a method of calculating a transmit weight based on channel information of the mobile station device in each sector, and transmitting a signal after multiplying the calculated weight with each sector.

13. The base station device according to claim 1, which uses, as the second macrodiversity method, fast sector selection with transmission muting, being a method that transmits a signal only from an arbitrary sector and does not transmit from remaining sectors.

14. The base station device according to claim 1, which uses, as the second macrodiversity method, a method of transmitting a signal at normal transmission power only from an arbitrary sector, and transmits at reduced transmission power from remaining sectors.

15. The base station device according to claim 10, which selects a macrodiversity method based on channel phase information from the base station device to the mobile station device, selecting the second macrodiversity method when the channel phase difference is greater than a predetermined threshold, and selecting soft-combining when it is smaller than the predetermined threshold.

16. A mobile station device which transmits a selection request signal for a first macrodiversity method and a second macrodiversity method to the base station device according to claim 1.

17. A mobile station device which transmits at least one of the reception power of another sector at the mobile station device and the difference between the reception powers of the self sector and the other sector, and the reception power of the self sector, to the base station device according to claim 3.

18. A mobile station device which transmits the received signal to interference plus noise ratio of the self sector at the mobile station device, and the reception power of the self sector, to the base station device according to claim 4.

19. A mobile station device which transmits at least one of:
the received signal to interference plus noise ratio of the self sector at the mobile station device and the received signal to interference plus noise ratio of the other sector; and
the difference between the received signal to interference plus noise ratios of the self sector and the other sector, and the reception power of the self sector, to the base station device according to claim 5.

20. The mobile station device according to claim 17, which further transmits the difference between the reception power of the self sector and an adjacent cell to the base station device according to claim 6.

21. The mobile station device according to claim 17, which further transmits the reception power of the adjacent cell to the base station device according to claim 6.

22. A mobile station device which transmits the received signal to interference plus noise ratio of the self sector at the mobile station device, and the received signal to interference plus noise ratio of an adjacent cell, to the base station device according to claim 6.

23. A mobile station device which transmits at least one of:
the received signal to interference plus noise ratio of the self sector at the mobile station device and the received signal to interference plus noise ratio of the other sector; and
the difference between the received signal to interference plus noise ratios of the self sector and the other sector, and the received signal to interference plus noise ratio of an adjacent cell, to the base station device according to claim 9.

24. The mobile station device according to claim 17, which extracts a phase difference between channels of a self sector, being a sector connected at the mobile station device, and another sector, being a sector which is not connected at the mobile station device, and transmits it to the base station device according to claim 15.

25. A mobile station device which selects whether to use macrodiversity in the base station device according to claim 3, selects a macrodiversity method to be used, and transmits a selection request signal for the first macrodiversity method and the second macrodiversity method to the base station device.

26. A macrodiversity selection method of selecting a first macrodiversity method of transmitting a signal created from identical information in a plurality of sectors from the sectors, and a second macrodiversity method of transmitting signal created from different information in a plurality of sectors from the sectors so as to suppress interference to an arbitrary sector, in accordance with a predetermined determination reference based on reception conditions of the mobile station device.

27. The macrodiversity selection method according to claim 26, which selects whether to use macrodiversity based on the reception power of a self sector, being a sector connected at the mobile station device, and on the difference the reception powers of the self sector and another sector, being a sector which is not connected at the mobile station device, and selects a macrodiversity method to be used.

28. The macrodiversity selection method according to claim 26, which selects whether to use macrodiversity based on the reception power of a self sector, being a sector connected at the mobile station device, and on the received signal to interference plus noise ratio of the self sector, and selects a macrodiversity method to be used.

29. The macrodiversity selection method according to claim 26, which selects whether to use macrodiversity based on the reception power of a self sector, being a sector connected at the mobile station device, and the difference between the received signal to interference plus noise ratios of the self sector and another sector, being a sector which is not connected at the mobile station device, and selects a macrodiversity method to be used.

30. The macrodiversity selection method according to claim 27, which further selects whether to use macrodiversity based on the difference between the reception powers of the self sector and an adjacent cell, and selects a macrodiversity method to be used.

31. The macrodiversity selection method according to claim 27, which further selects whether to use macrodiversity based on the reception power of an adjacent cell, and selects a macrodiversity method to be used.

32. The macrodiversity selection method according to claim 26, which selects whether to use macrodiversity based on the received signal to interference plus noise ratio of an adjacent cell, and the received signal to interference plus noise ratio of a self sector connected at the mobile device, and selects a macrodiversity method to be used.

33. The macrodiversity selection method according to claim 26, which selects whether to use macrodiversity based on the received signal to interference plus noise ratio of an adjacent cell, and the difference between the received signal to interference plus noise ratios of a self sector, being a sector connected at the mobile station device, and another sector, being a sector which is not connected at the mobile station device, and selects a macrodiversity method to be used.

34. The macrodiversity selection method according to claim 27, which, based on channel phase information from the base station device to the mobile station device, when the channel phase difference is greater than a predetermined threshold, selects the second macrodiversity method that transmits a signal created from different information in a plurality of sectors from the sectors such as to suppresses interference to an arbitrary sector, and, when the channel phase difference is smaller than the predetermined threshold, selects soft-combining as a first macrodiversity method that transmits signals that are identical among the sectors.

35. A wireless communication system that selects macrodiversity using the macrodiversity selection method according to claim 26 at a base station device or a mobile station device.

* * * * *